(12) United States Patent
Hajjar et al.

(10) Patent No.: US 12,518,366 B2
(45) Date of Patent: Jan. 6, 2026

(54) AUTOMATED ASSESSMENT OF CRACKS USING LIDAR AND CAMERA DATA

(71) Applicant: Northeastern University, Boston, MA (US)

(72) Inventors: Jerome F. Hajjar, Newton, MA (US); Yujie Yan, Nanjing (CN)

(73) Assignee: Northeastern University, Boston, MA (US)

( * ) Notice: Subject to any disclaimer, the term of this patent is extended or adjusted under 35 U.S.C. 154(b) by 522 days.

(21) Appl. No.: 17/929,466

(22) Filed: Sep. 2, 2022

(65) Prior Publication Data

US 2023/0080178 A1 Mar. 16, 2023

Related U.S. Application Data

(60) Provisional application No. 63/242,903, filed on Sep. 10, 2021, provisional application No. 63/240,344, filed on Sep. 2, 2021.

(51) Int. Cl.
*G06T 7/00* (2017.01)
*G01S 17/894* (2020.01)
(Continued)

(52) U.S. Cl.
CPC .......... *G06T 7/0002* (2013.01); *G01S 17/894* (2020.01); *G06T 7/13* (2017.01);
(Continued)

(58) Field of Classification Search
CPC .......... G06T 7/0002; G06T 7/55; G06T 7/13; G06T 2207/10028; G06T 2207/10032;
(Continued)

(56) References Cited

U.S. PATENT DOCUMENTS 11,663,554 B2 * 5/2023 Currin .................... G06Q 10/06 705/314
12,159,387 B2 * 12/2024 Matsumoto ........... G06T 7/0004
(Continued)

FOREIGN PATENT DOCUMENTS

CN 113870326 A * 12/2021 ......... G06F 18/2321
JP 7113657 B2 * 8/2022 ......... G06F 18/2431
(Continued)

OTHER PUBLICATIONS

Hirose, Mitsuhito et al., "Implementation of UAV localization methods for a mobile post-earthquake monitoring system," 2015 IEEE Workshop on Environmental, Energy, and Structural Monitoring Systems (EESMS) Proceedings, Trento, Italy, 2015, pp. 66-71, doi: 10.1109/EESMS.2015.7175854. (Year: 2015).*
(Continued)

*Primary Examiner* — Shefali D Goradia
(74) *Attorney, Agent, or Firm* — Hamilton, Brook, Smith & Reynolds, P.C.

(57) ABSTRACT

Embodiments automatically assess, e.g., quantify dimensions of, cracks in real-world objects. Amongst other examples, such functionality can be used to identify structural problems in bridges and buildings. An example implementation maps pixels in an image of a real-world object to corresponding points in point cloud data of the real-world object. In turn, a patch in the image data that includes a crack is identified by processing, using a classifier, the pixels with the corresponding points mapped. Pixels in the patch that correspond to the crack are then identified based on one or more features of the image. Real-world dimensions of the crack are determined using the identified pixels in the patch corresponding to the crack.

17 Claims, 17 Drawing Sheets
(11 of 17 Drawing Sheet(s) Filed in Color)

| (51) | Int. Cl. | |
|---|---|---|
| | G06T 7/13 | (2017.01) |
| | G06T 7/55 | (2017.01) |
| | G06V 10/80 | (2022.01) |
| | G06V 20/10 | (2022.01) |
| | G06V 10/82 | (2022.01) |
| | G06V 20/17 | (2022.01) |

(52) U.S. Cl.
CPC .............. *G06T 7/55* (2017.01); *G06V 10/803* (2022.01); *G06V 20/176* (2022.01); *G06T 2207/10028* (2013.01); *G06T 2207/10032* (2013.01); *G06T 2207/20021* (2013.01); *G06T 2207/20081* (2013.01); *G06T 2207/20084* (2013.01); *G06T 2207/30108* (2013.01); *G06T 2207/30244* (2013.01); *G06V 10/82* (2022.01); *G06V 20/17* (2022.01)

(58) Field of Classification Search
CPC . G06T 2207/20021; G06T 2207/20081; G06T 2207/20084; G06T 2207/30108; G06T 2207/30244; G01S 17/894; G06V 10/803; G06V 10/82; G06V 20/176; G06V 20/17
See application file for complete search history.

(56) References Cited

U.S. PATENT DOCUMENTS

| 2018/0211373 | A1* | 7/2018 | Stoppa | G06T 7/55 |
| 2020/0074266 | A1* | 3/2020 | Peake | G06V 10/764 |
| 2021/0221506 | A1* | 7/2021 | Phelan | G01S 13/951 |
| 2022/0092856 | A1* | 3/2022 | Wu | G06V 20/17 |

FOREIGN PATENT DOCUMENTS

| WO | WO-2020046213 A1 * | 3/2020 | G06N 3/0454 |
| WO | WO-2021224893 A1 * | 11/2021 | G01N 21/95 |
| WO | WO-2022115766 A1 * | 6/2022 | B64U 10/13 |

OTHER PUBLICATIONS

Alipour, M. et al., "Robust Pixel-Level Crack Detection Using Deep Fully Convolutional Neural Networks", Journal of Computing in Civil Engineering, vol. 33, No. 6, 2019, 04019040, pp. 1-14.

Bhowmick, S. et al., "Vision and Deep Learning-Based Algorithms to Detect and Quantify Cracks on Concrete Surfaces from UAV Videos", Sensors, vol. 20, Issue 21, 2020, pp. 1-19.

Law, D. W. et al., "Terrestrial laser scanner assessment of deteriorating concrete structures", vol. 25, Issue 5, 2018, pp. 1-15.

Ren, Y. et al., "Image-based concrete crack detection in tunnels using deep fully convolutional networks", Construction and Building Materials, vol. 234, 2020, 117367, pp. 1-12.

Weng, X. et al., "Segment-based pavement crack quantification", Automation in Construction, vol. 105, 2019, 102819, pp. 1-16.

* cited by examiner

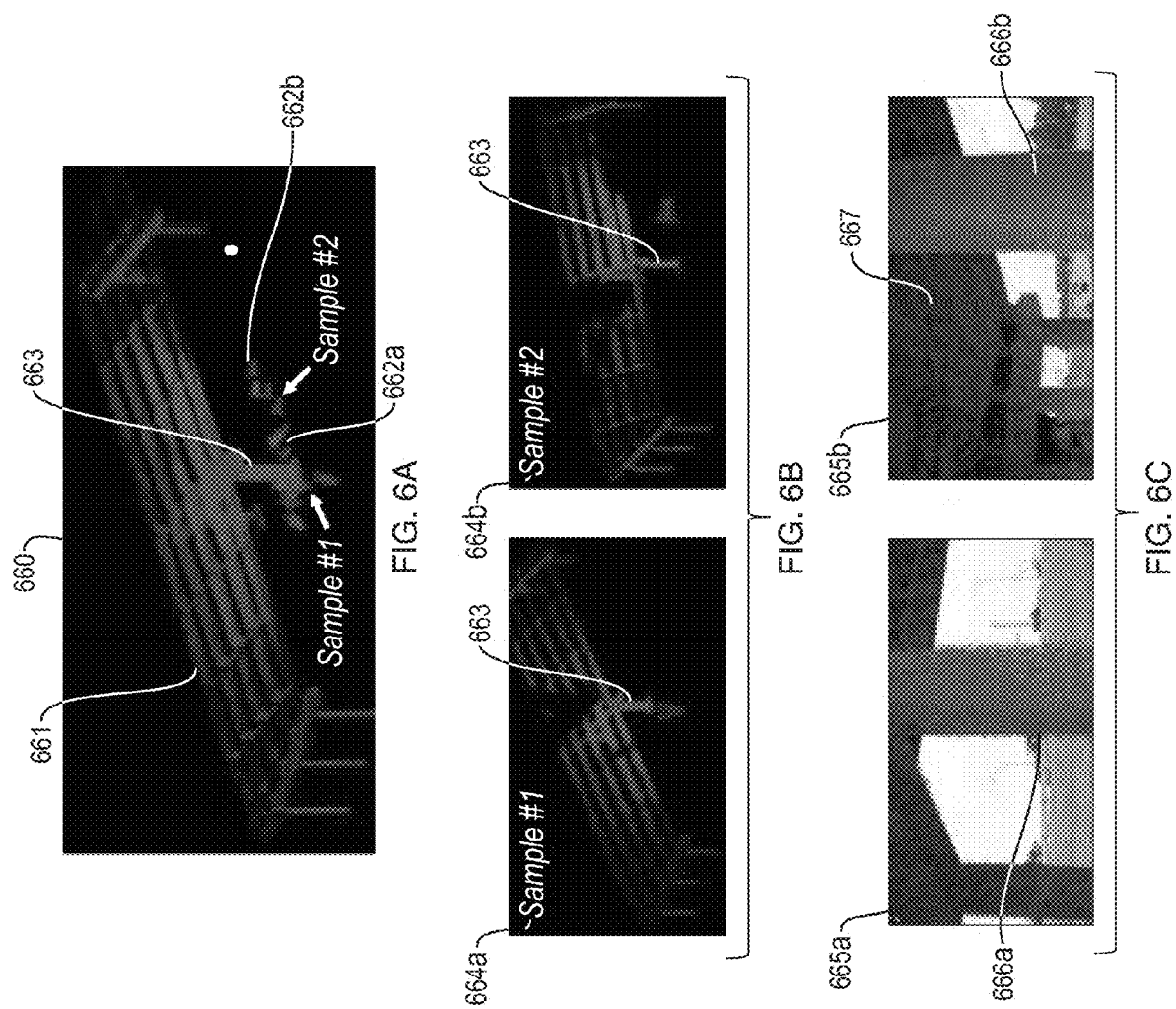

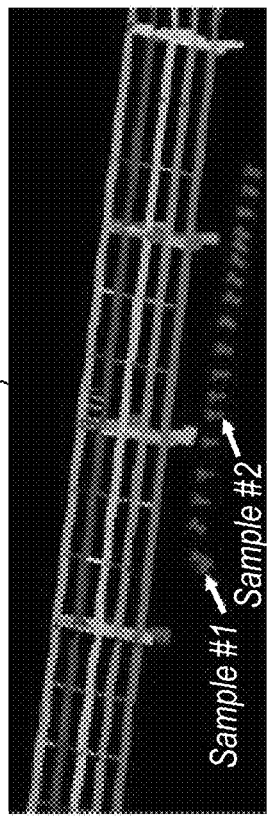
FIG. 7A
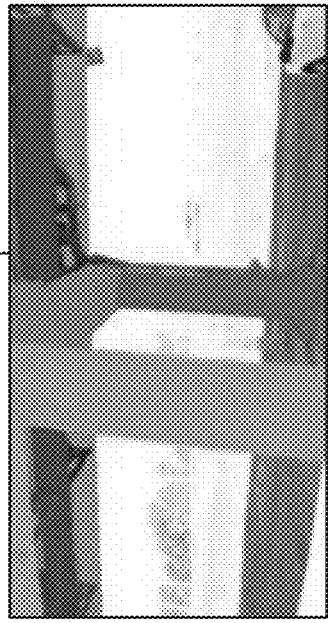
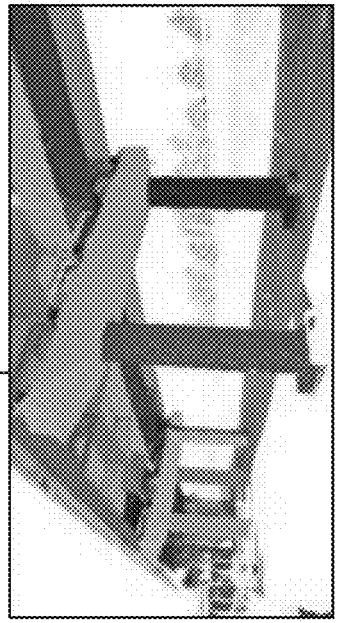
FIG. 7B

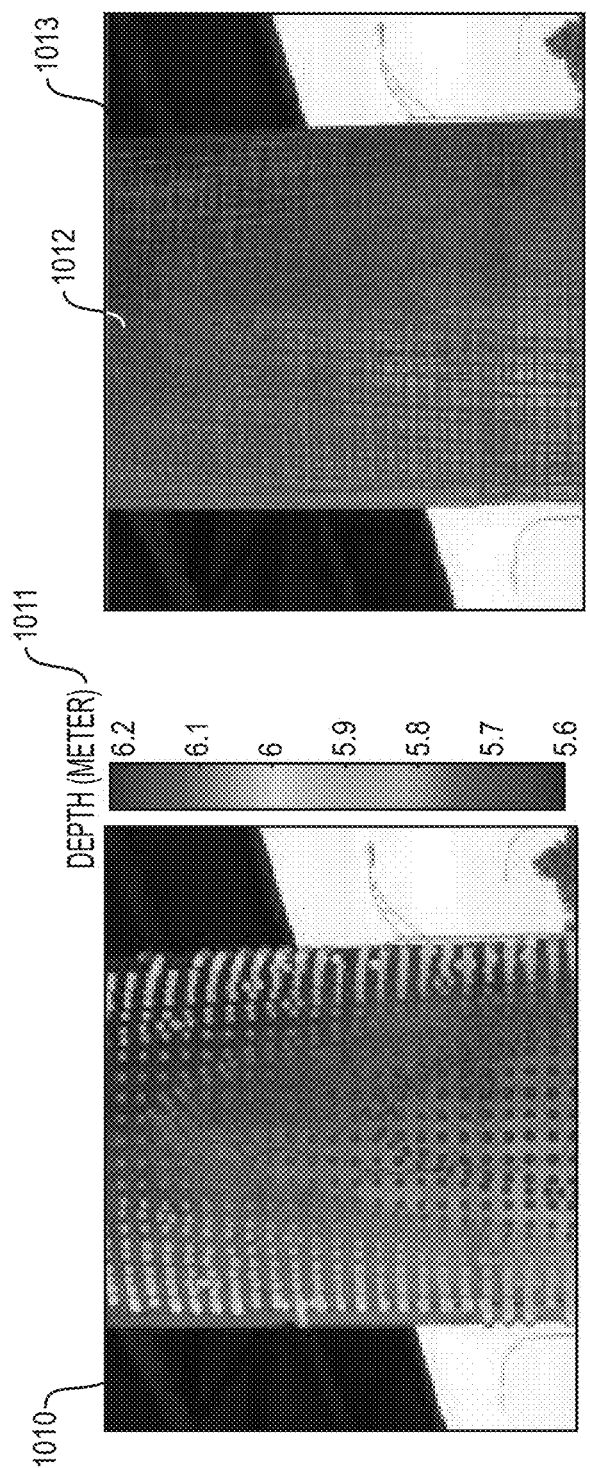

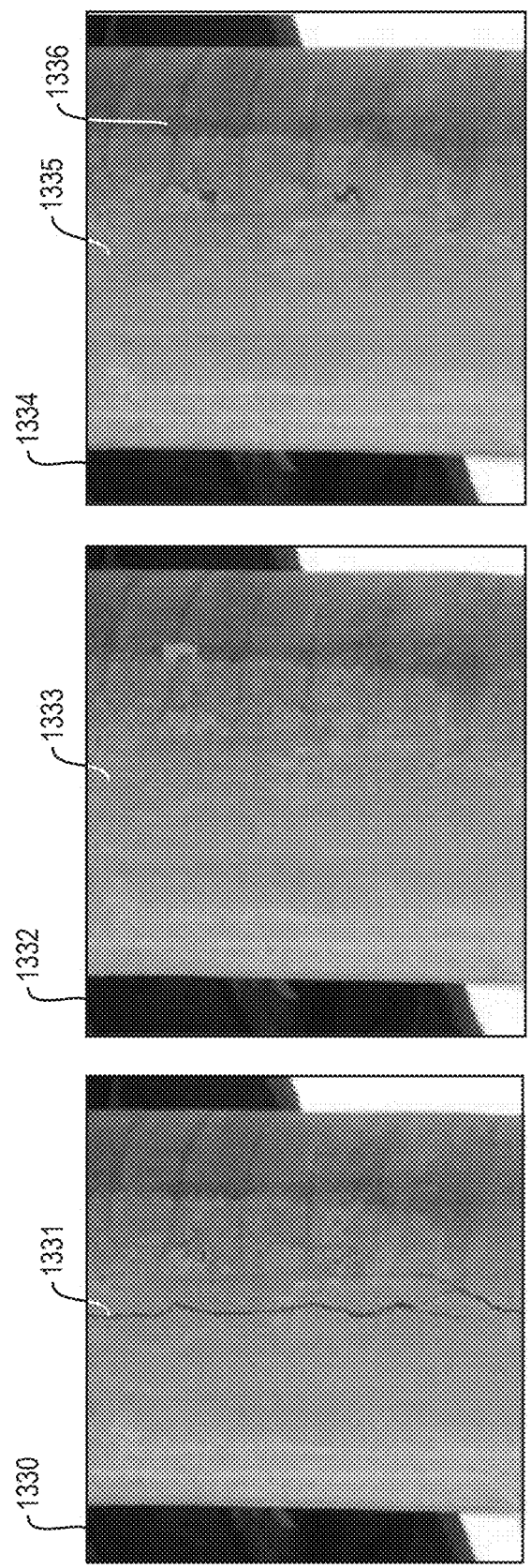

AUTOMATED ASSESSMENT OF CRACKS USING LIDAR AND CAMERA DATA

RELATED APPLICATIONS

This Application claims the benefit of U.S. Provisional Application No. 63/240,344, filed on Sep. 2, 2021 and U.S. Provisional Application No. 63/242,903 filed on Sep. 10, 2021. The entire teachings of the above Applications are incorporated herein by reference.

GOVERNMENT SUPPORT

This invention was made with government support under Grant No. 1328816 awarded by the National Science Foundation, and Grant No. HSHQDC-07-3-00005 awarded by the Department of Homeland Security. The government has certain rights in the invention.

BACKGROUND

Infrastructure, e.g., bridges and buildings, amongst other examples, is subject to deterioration. Deterioration increases over time and can cause safety hazards.

SUMMARY

The number of aging infrastructures has been increasing and become a significant concern. As such, functionality is needed to assess infrastructures. Embodiments provide such functionality. Specifically, embodiments automatically assess cracks using light detection and ranging (lidar) data (or other such point cloud-based data) and camera data.

An example embodiment of the invention includes a collection of computer-implemented methods that automatically process unmanned aerial vehicle (UAV) based lidar data and camera data for the purpose of crack detection and quantification. Such functionality is useful for bridge inspection and condition assessment. An embodiment automatically extracts individual structural members from the sensor data and assesses the cracks in each structural member separately, in order to enable bridge element inspection as recommended by the American Association of State Highway and Transportation Officials. An example embodiment is intended to be implemented as a complementary tool to enhance the efficiency and accuracy of current bridge inspection practices, which are predominantly based on human observation and measurement and, thus, can be labor-intensive and error prone.

An embodiment is directed to a computer-implemented method to automatically assess cracks in real-world objects. An example computer-implemented method embodiment for automatically assessing cracks in real-world objects begins by mapping pixels in an image of a real-world object to corresponding points in point cloud data of the real-world object. Such an embodiment continues by identifying a patch (or multiple patches) in the image data that includes a crack (or multiple cracks) by processing the pixels with the corresponding points mapped using a classifier, e.g., a deep learning based classifier. In turn, based on one or more features of the image, identifying pixels in the patch (or patches) corresponding to the crack are identified. An example embodiment uses an adaptive thresholding method along with the one or more features to identify the pixels in the patch corresponding to the crack. To continue, the identified pixels in the patch corresponding to the crack are used to determine real-world dimensions of the crack.

According to an embodiment, the point cloud data is light detection and ranging (LIDAR) data captured by a LIDAR sensor and the image is captured by a camera. Such an embodiment may capture the LIDAR data and the image via mounting the LIDAR sensor and the camera on an unmanned aerial vehicle (UAV). An example embodiment maps the pixels to the corresponding points based on (i) a transformation between a reference frame of the camera and a reference frame of the LIDAR sensor, (ii) a pose of the camera when capturing the image, and (iii) a pose of the LIDAR sensor when capturing the LIDAR data.

According to an embodiment, the one or more features of the image include at least one of pixel intensity values and gradients. In another embodiment, identifying the pixels in the patch corresponding to the crack comprises at least one of identifying pixels in the patch with an intensity below a threshold as the pixels corresponding to the crack and identifying pixels in a patch with an intensity gradient above a threshold as boundary pixels of the crack, i.e., the pixels forming a boundary outline of the crack.

Another example embodiment sets one or both aforementioned thresholds. Such an embodiment determines an intensity distribution of the patch and sets a given threshold, adaptively, based on the determined intensity distribution.

According to an embodiment, identifying the pixels in the patch corresponding to the crack comprises identifying pixels in the patch forming a boundary outline of the crack and identifying pixels within the boundary outline. In such an embodiment, the identified pixels in the patch forming the boundary outline of the crack and the identified pixels within the boundary outline are the pixels in the patch corresponding to the crack.

In yet another example embodiment, the image is a sub-image of a main-image, and the method further comprises identifying the sub-image. According to an embodiment, the sub-image includes a support member of the real-world object. Embodiments may be used to assess cracks for any real-world objects. For instance, in an example embodiment, the real-world object is a bridge, a building, a steel structure, or a concrete structure.

According to an embodiment, the classifier is a convolutional neural network (CNN) trained to identify portions of images containing one or more cracks.

An embodiment determines real-world dimensions of the crack using the identified pixels in the patch corresponding to the crack by, for each identified pixel in the patch corresponding to the crack: (i) determining depth of the pixel based on a corresponding point in the point cloud data mapped to the pixel and (ii) determining real-world area of the real-world object represented by the pixel using the determined depth of the pixel.

Another example embodiment is directed to a computer system for automatically assessing cracks in real-world objects. The computer system includes a processor and a memory with computer code instructions stored thereon. In such an embodiment, the processor and the memory, with the computer code instructions, are configured to cause the system to automatically assess cracks according to any embodiment or combination of embodiments described herein.

Yet another embodiment is directed to a computer program product for automatically assessing cracks in real-world objects. The computer program product comprises one or more non-transitory computer-readable storage devices and program instructions stored on at least one of the one or more storage devices. The program instructions, when loaded and executed by a processor, cause an apparatus associated with the processor to assess cracks as described herein.

Further details and example embodiments are described below and in the provisional applications as filed, U.S. Provisional Application No. 63/240,344, filed on Sep. 2, 2021 and U.S. Provisional Application No. 63/242,903 filed on Sep. 10, 2021, the contents of which are herein incorporated by reference in their entirety.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 6A and 6B are point clouds utilized in embodiments.

FIG. 6C illustrates an image with point cloud data overlaid thereon according to an embodiment.

FIGS. 7A and 7B illustrate an example of mapping the point cloud data of FIG. 7A on an image in FIG. 7B.

FIG. 10A is an image with mapped laser point data with associated depths determined in an embodiment.

FIG. 10B illustrates image patches identified according to an embodiment.

FIGS. 13A-C are images illustrating steps of a crack-pixel identification technique utilized in embodiments.

DETAILED DESCRIPTION

Figure 1:
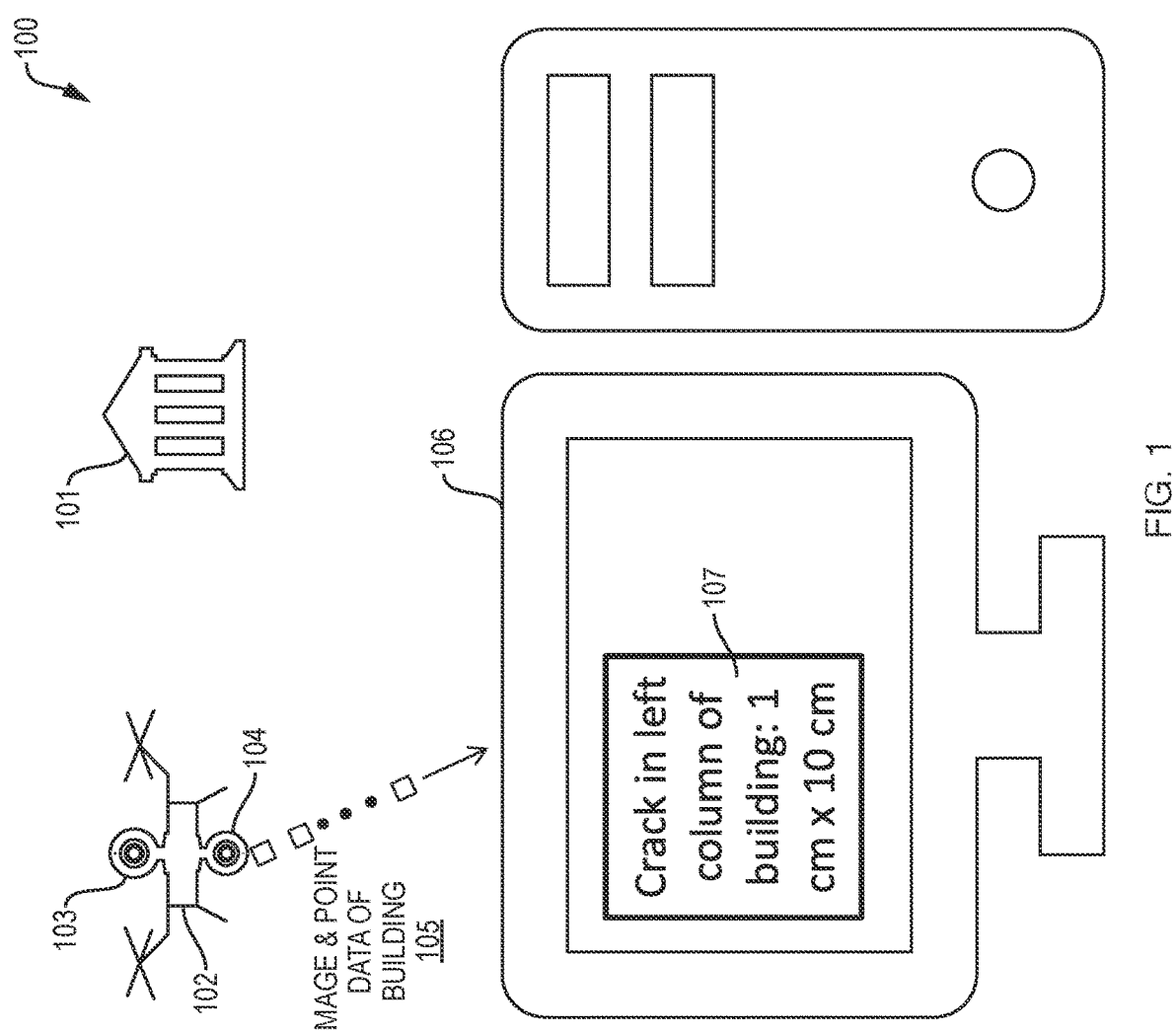
FIG. 1 is a simplified block diagram of an environment in which embodiments can be implemented.

A description of example embodiments follows.

1—INTRODUCTION

The increasing number of aging infrastructure has become a nationwide concern. For example, the most recent infrastructure report [1] (bracketed numbers in this document refer to the enumerated list of references hereinbelow) from the American Society of Civil Engineers (ASCE) reveals that more than 60,000 bridges nationwide are structurally deficient. To ensure the functionality of the infrastructure under both service loads and extreme loads, existing surface defects need to be assessed and documented periodically. To facilitate this process, the utilization of visual sensing technology as a complimentary or alternative approach to physical observations and measurements is currently being investigated. Acquired visual data provide accurate documentation of the surface textures and three-dimensional (3D) geometries of the structures and, thus, can be processed through either human interpretation or automated procedures to assess the surface defects in structures. In order to facilitate the implementation of visual sensing technology, a variety of research has been put forward to improve the data acquisition process through development of robotic platforms [2] that include ground-based vehicles [3][4], climbing platforms [5][6], and aerial platforms [7][8][9]. Recent studies have also featured the development of methodologies to automate the postprocessing of the acquired visual sensor data towards the extraction of meaningful information that includes object information [10][11][12], surface defects [13][14][15][16][17], and key displacements [18] [19].

In order to evaluate the conditions of infrastructure, cracks in critical structural elements need to be assessed and documented comprehensively. A variety of methods have been proposed in recent studies to support automated assessment of cracks from visual sensor data, particularly light detection and ranging (lidar) data, or other such point cloud data, and red-green-blue (RGB) images. Lidar data mainly captures 3D geometric information and is typically invariant to illumination conditions and background textures. The 3D geometric information can be utilized to facilitate object detection and recognition as well as to quantify detected cracks. For example, to assess cracks in timber elements, Cabaleiro [20] proposed detecting cracks through identifying the gaps in the lidar data and, then, delineating crack boundaries using Alpha-shapes. Guldur Erkal and Haijar [13] proposed a surface normal-based method for automated crack detection and quantification based on a terrestrial lidar scanner. In addition to the lidar data, in Guldur Erkal and Haijar [13], the color information from a camera was augmented to enhance the robustness of the proposed method to identify microcracks. To better understand the range of applicability of lidar data, Laefer [21] conducted a collection of laboratory experiments to investigate minimum crack width that could be captured by terrestrial lidar scanners. The experimental results indicated at a distance of 5 m, cracks with widths greater than 5 mm could typically be captured with errors as low as 3%.

Recent advances in unmanned aerial vehicles (UAVs) provide a more versatile and cost-effective approach for visual data acquisitions [22]. Nevertheless, state-of-the-art UAV-based lidar data (data collected with a lidar sensor on a UAV) typically has a centimeter-level of accuracy [23], which is inadequate for crack assessment purposes. Since UAV-based imaging has been widely implemented in civil engineering applications, a variety of research efforts have been put forward to develop automated image-based crack assessment approaches [24][25]. Edge detector-based approaches and deep learning-based approaches are two of the most widely implemented methods. Edge detector-based approaches are aimed at inferring cracks through identifying pixels with high local gradient magnitude. A variety of edge detectors have been proposed in the literature, and they vary depending on the formulation of local image gradient and thresholding methods. The performance of these edge detectors in detecting cracks were evaluated and compared quantitively by Abdel-Qader [26] and Dorafshan [27]. In order to improve the robustness of edge detectors to noise in images, edge detectors are normally combined with certain preprocessing or postprocessing steps. Example preprocessing and postprocessing steps include object detection to narrow down the searching areas [28], adaptive noise filtering and contrast enhancement to improve the quality of the images [29], and circularity checking to improve the edge detection results by exploiting the geometric characteristics of cracks [30][31].

By leveraging recent advances of deep learning techniques, the effectiveness of convolution neural networks (CNNs), which are capable of learning both feature extraction and classification from training datasets, in detecting cracks was investigated. A study from Cha [32] indicated that a well-trained CNN classifier was able to detect cracks with an accuracy of 97% under various illumination conditions. The accuracy of the CNN classifier could be further improved through either implementing appropriate postprocessing steps [33] or improving the configuration of the hidden layers [27]. These approaches were effective in recognizing cracks at a patch-level. Nevertheless, such CNN-based approaches typically require sub-images to be enumerated using a sliding window technique and, thus, require the scale of images to be perceived. In addition, the geometry and density of the cracks could not be captured accurately using the identified crack patches. To overcome these limitations, recent studies also featured other variations of CNNs that are more robust to image scales and more capable of recognizing cracks at a pixel level, such as region-based CNN (RCNN) [34][35], mask RCNN [36][37], and fully convolutional networks (FCN) [38][39].

Although a variety of approaches have been proposed for automated crack assessment with images, there still exist two limitations: (1) the accuracy of crack detection can potentially be affected by the presence of a complex background and (2) the automated quantification of cracks in units of measurement from images remains a challenge because the scales of the images are often not known a priori. Embodiments solve these problems and provide new automated crack assessment methods that address these limitations by integrating images with lidar data.

In embodiments, object information extracted from lidar data [40] is mapped onto images to identify the regions of interest (ROIs) where cracks have the potential to occur (e.g., a reinforced concrete substructure element or a bridge deck). In addition, depth maps of the images are retrieved and combined with a camera model to estimate actual image pixel sizes. The actual image pixel sizes have the potential to be utilized to enhance the accuracy of crack detection as well as to enable the crack quantification in units of measurement. Since an embodiment only uses the lidar data for the object detection and depth estimation, such an embodiment can exploit lidar data with a wide range of data quality, including UAV-based lidar data. To highlight this feature, quantitative validations described below, were carried out on images and lidar data collected using a UAV platform.

Two studies that are relevant to this document are Bhowmick [41] and McLaughlin [42] both of which proposed new frameworks for surface damage detection and quantification. The framework from Bhowmick [41] was developed for UAV-based videos and was validated using experimental specimens. In comparison, embodiments proposed herein provide advances in two aspects, amongst others: (1) ROIs are identified automatically in each image by exploiting object information extracted from lidar data, in which case no manual selection is required and (2) actual pixel sizes are obtained directly based on lidar data, which does not require any size of a reference object to be known a priori. The framework from McLaughlin [42] was developed for ground robot-based visual sensor data, which included lidar data, RGB camera data, and infrared camera data. In comparison, embodiments are applicable for UAV-based data, which is often nosier than ground-based robots [2]. In addition, embodiments can use object information from lidar data to filter out background objects in images and, hence, avoid excessive damage detection processes.

2—METHODOLOGY

FIG. 1. is a simplified diagram of an example environment 100 in which embodiments may be implemented. The environment 100 includes a real-world object, building 101, that is being evaluated for cracks. In the environment 100, the UAV 102 is outfitted with a RGB camera 103 and lidar sensor 104 that capture image and point cloud data (collectively 105), respectively, of the building 101. The image and point cloud data 105 is sent or otherwise exported from the camera 103, lidar sensor 104, and/or UAV 102 to the computing device 106 for processing. The computing device 106 implements the methods described herein, e.g., the method 220 described hereinbelow in relation to FIG. 2, to assess cracks in the building 101. Results 107 of the assessment by the computing device 106 are provided in a graphical user interface (GUI) on the computing device 106.

Figure 2:
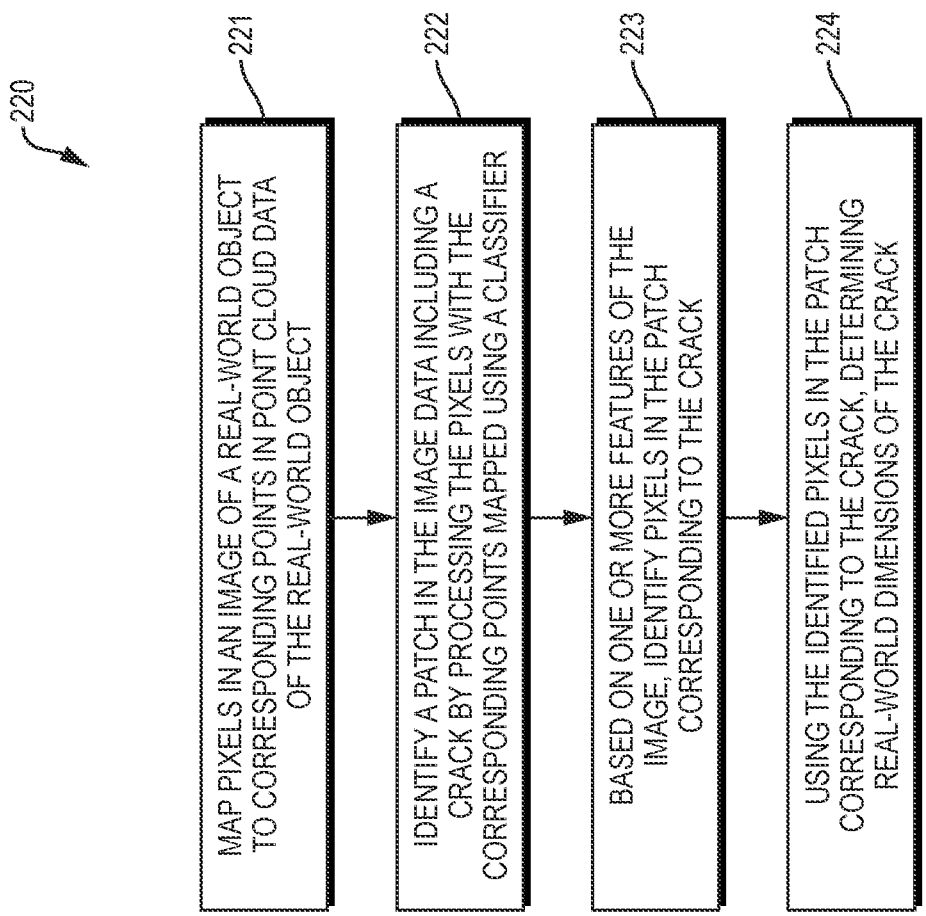
FIG. 2 is a flowchart of a method for assessing cracks in real-world objects according to an embodiment.

FIG. 2 is a flowchart of a method 220 that is implemented in the environment 100 to automatically assess cracks in real-world objects, e.g., the building 101. The method 220 starts by mapping 221 pixels in an image of a real-world object to corresponding points in point cloud data of the real-world object. The method 220 continues by identifying 222 a patch (or multiple patches) in the image data that includes a crack (or multiple cracks) by processing the pixels with the corresponding points mapped using a classifier. In turn, based on one or more features of the image, the method 220 identifies 223 pixels in the patch corresponding to the crack. An example embodiment of the method 220 uses an adaptive thresholding method along with the one or more features to identify 223 the pixels in the patch corresponding to the crack. To continue, the identified pixels in the patch corresponding to the crack are used to determine 224 real-world dimensions of the crack.

According to an embodiment of the method 220, the point cloud data is light LIDAR data captured by a LIDAR sensor and the image is captured by a camera. Such an embodiment of the method 220 may further include capturing the LIDAR data and the image via mounting the LIDAR sensor and the camera on an unmanned aerial vehicle (UAV).

In an embodiment of the method 220 the pixels are mapped 221 to the corresponding points based on (i) a transformation between a reference frame of the camera and a reference frame of the LIDAR sensor, (ii) a pose of the camera when capturing the image, and (iii) a pose of the LIDAR sensor when capturing the LIDAR data.

According to an embodiment, the one or more features of the image used to identify 223 pixels in the patch include at least one of pixel intensity values and pixel intensity gradients. In an embodiment of the method 220 identifying 223 the pixels in the patch corresponding to the crack comprises at least one of: (i) identifying pixels in the patch with an intensity below a threshold as the pixels corresponding to the crack and (ii) identifying pixels in a patch with an intensity gradient above a threshold as boundary pixels, i.e., pixels forming a boundary outline of the crack.

The method 220 may further set one or both of the aforementioned thresholds. To set the threshold(s) such an embodiment determines an intensity distribution of the patch and sets a given threshold, i.e., one or both of the foregoing thresholds, adaptively based on the determined intensity distribution.

According to an embodiment, identifying 223 the pixels in the patch corresponding to the crack comprises identifying pixels in the patch forming a boundary outline of the crack and identifying pixels within the boundary outline. In such an embodiment, the identified pixels in the patch forming the boundary outline of the crack and the identified pixels within the boundary outline are the pixels in the patch corresponding to the crack.

In yet another example embodiment of the method 220, the image is a sub-image of a main-image, and the method 220 further comprises identifying the sub-image. According to an embodiment the sub-image includes a support member of the real-world object.

Embodiments of the method 220 may be used to assess cracks for any real-world objects. For instance, in an example embodiment, the real-world object is a bridge, a building, a steel structure, or a concrete structure.

According to an embodiment, the classifier used to identify 222 the patch in the image that includes a crack is a deep learning based classifier. For instance, in an embodiment, the classifier is a convolutional neural network (CNN) trained to identify portions of images containing one or more cracks.

An embodiment of the method 220 determines 224 real-world dimensions of the crack using the identified pixels in the patch corresponding to the crack by, for each identified pixel in the patch corresponding to the crack: (i) determining depth of the pixel based on a corresponding point in the point cloud data mapped to the pixel and (ii) determining real-world area of the real-world object represented by the pixel using the determined depth of the pixel.

Figure 3:
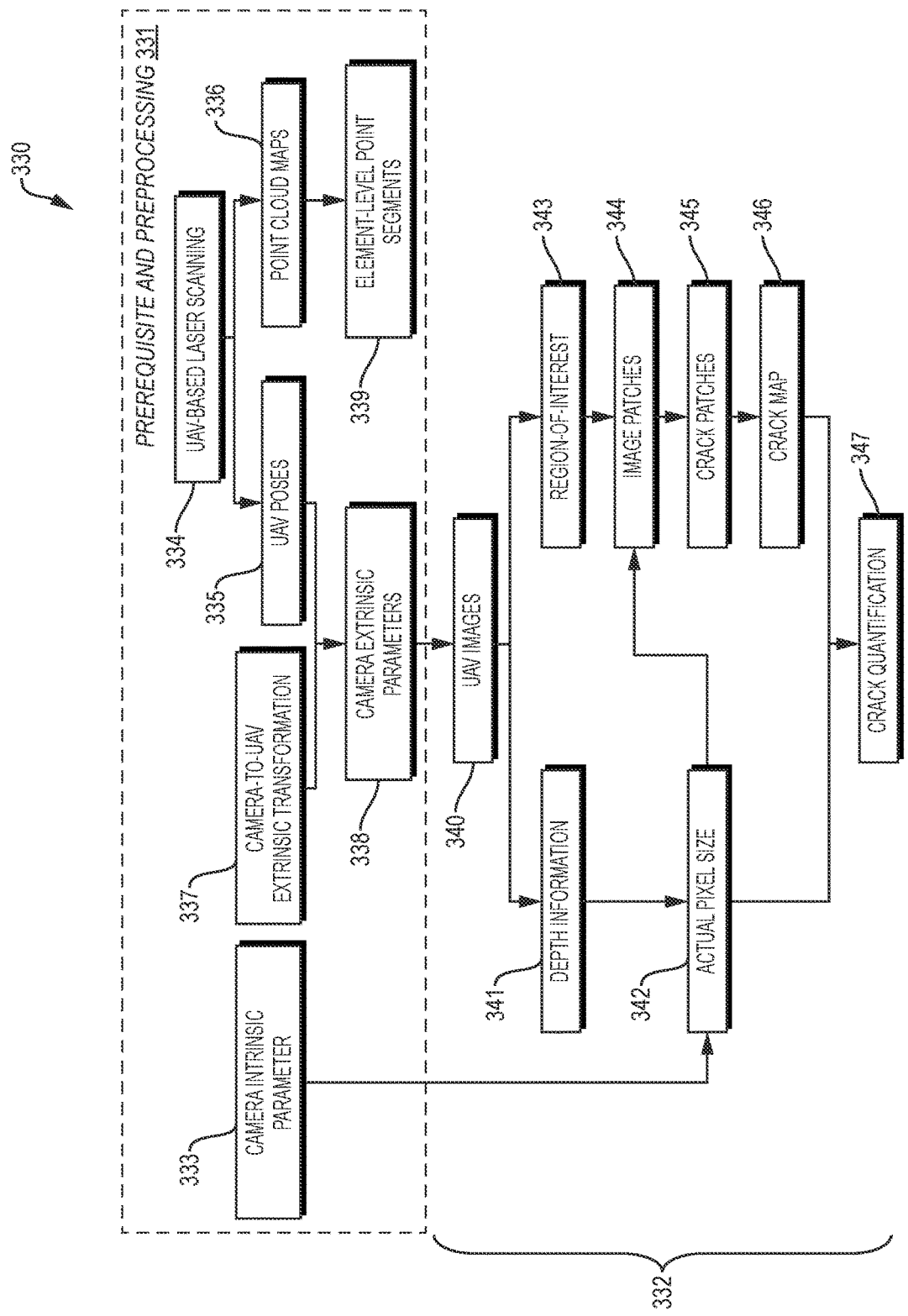
FIG. 3 is a flowchart of a method according to an example embodiment.

A flowchart of a method 330 embodiment is shown in FIG. 3. The method 330 includes a pre-requisite and pre-processing phase 331 and a processing phase 332. The method 330 relies on camera intrinsic parameter data 333, which includes, for example, focal length, lens distortion, and axis skew, amongst other examples. Further, for the UAV-based laser scanning 334, UAV pose data 335 is acquired as well as point cloud maps 336. The UAV pose data 335 indicates the poses, i.e., the locations and orientations in space, of the lidar sensor when the point cloud maps 336 are collected. The preprocessing 331 generates element-level point segments 339 from the point cloud maps 336. The element-level point segments 339 are segmented point maps corresponding to sub-elements of the real-world object being assessed. Further, preprocessing 331 uses an extrinsic camera-to-UAV transformation 337 with the UAV poses 335 to determine the camera extrinsic parameters 338. To illustrate, in an embodiment where UAV-based laser scanning is used, Simultaneous Localization and Mapping (SLAM) or other such mapping method, is used to generate a point cloud map, and simultaneously estimate the UAV trajectory and poses 335 (at any moment) with respect to the point cloud map. Using the transformation between the camera and the UAV 337 and the UAV poses 335, an embodiment computes the extrinsic parameters 338. Amongst other examples, the determined camera extrinsic parameters 338 include positions and poses of the camera.

During the processing phase 332, for each UAV image 340, the method 330 uses the corresponding camera extrinsic parameters 338, to map the element-level point segments 339 onto the UAV image 340 to determine depth information 341. The depth information 341 is used along with camera intrinsic parameters 333 to determine the actual size of pixels 342 in units of measurement. Further, a ROI 343 is extracted from the UAV images 340. The ROI 343 with the determined actual pixel size 342 is used to identify image patches 344. From image patches 344, crack patches 345 are identified and, in turn, a crack map 346 is determined. The crack map 346 is used with the actual pixel size 342 to determine a quantification 347 of a crack size.

What follows is a description of example embodiments of carrying out the methods 220 and 330 described hereinabove in relation to FIGS. 2 and 3, respectively. In Section 2.1, the input data used by embodiments is defined, and the data preparation steps are introduced. The data preparation steps include hardware development, lidar data processing, and camera calibration. In an embodiment, point cloud maps with object labeling and lidar poses are computed through implementing methods known to those of skill in the art. In an embodiment, camera calibration and intrinsic parameters are pre-calibrated and kept constant during data collection. In embodiments, extrinsic parameters vary depending on the pose of the device used to collect the data, e.g., a lidar sensor on a UAV. As such, a transformation between a camera frame of reference and UAV frame, i.e., frame of sensor capturing point data, at the initial condition, which is constant, is calibrated prior to the data collection. In an embodiment, a calibration process is performed only once (as long as the UAV setup does not change) to obtain a transformation between a UAV and camera model at an initial condition. This transformation is used to obtain the extrinsic parameters of the camera during data collection. In an embodiment, the extrinsic parameters are computed automatically based on lidar poses. Once the required input data are prepared, embodiments are carried out for crack assessment as explained in Sections 2.1.1-2.5 below.

2.1—Dataset Preparation 2.1.1—Hardware

Embodiments may use any variety of camera and lidar sensors located in any variety of locations to collect data of real-world objects subject to the crack assessment functionality described herein. One such embodiment utilizes a camera and lidar sensor mounted on a UAV to collect data. An embodiment uses a DJI M600 Pro UAV equipped with a lidar system and a RGB camera system. In an embodiment, the lidar system is placed beneath the UAV, and the lidar system includes a Velodyne VLP-16 lidar scanner with a maximum range of 100 m and a range accuracy of ±3 cm. The lidar sensor has a horizontal angular resolution of 0.1°-0.4° and a vertical angular resolution of 2°. The horizontal field of view (FOV) of the lidar sensor is −180° to 180°, and the vertical FOV is −15° to 15°. To accommodate the varying fields of view and angular resolutions, the lidar sensor is connected to a stepper motor through a gimbal and actuated to spin continuously at a rate of 30 rpm. The gimbal is a pivoted support that allows the lidar sensor to rotate freely. An embodiment does not utilize stabilization for the gimbal. An embodiment also employs a rotary encoder, attached to the gimbal, to measure the rotary angle in real time.

An embodiment utilizes a DJI Zenmuse Z3 camera system, which has a CMOS 1/2.3" image sensor. The camera has a maximum resolution of 12.76 megapixels and has a 22-77 mm f/2.8-5.6 zoom lens. According to an embodiment, the camera is attached to the top of the UAV through a motorized three-axis gimbal that can rotate within a range of −90° to 30° in pitch, −320° to 320° in yaw, and −15° to 15° in roll. In an example implementation, data is collected with the roll and yaw angles at 0° and the pitch angle at 10° so that the camera is pointing above the local level. The camera parameters, including focal length, ISO, and shutter speed, are kept constant throughout data collection, and images with a resolution of 3840×2160 pixels are acquired. More details regarding hardware setups that may be utilized in embodiments are presented in Yan and Hajjar [40].

2.1.2—Lidar Data Processing

Figure 4B:
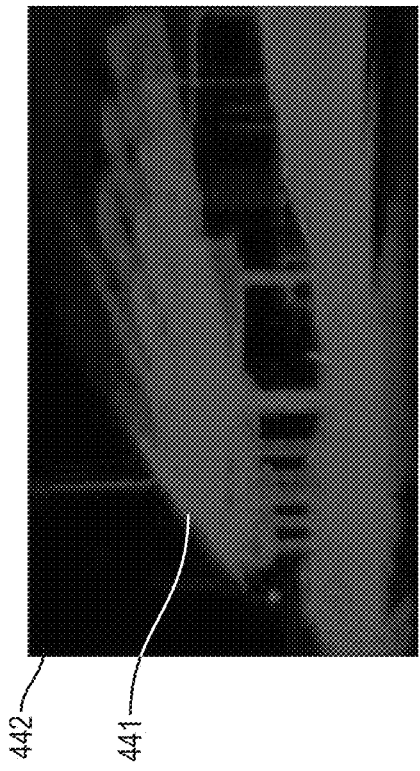
FIG. 4B is a point cloud of the bridge depicted in FIG. 4A.
Figure 4A:
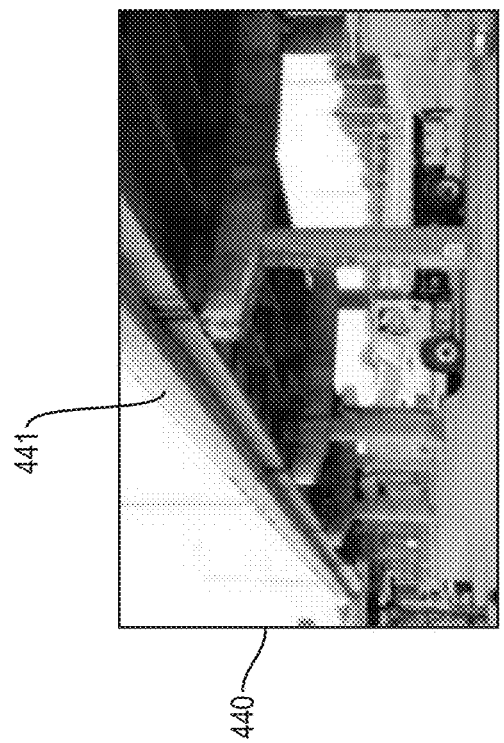
FIG. 4A is an image of bridge that may be assessed using embodiments.
Figure 4C:
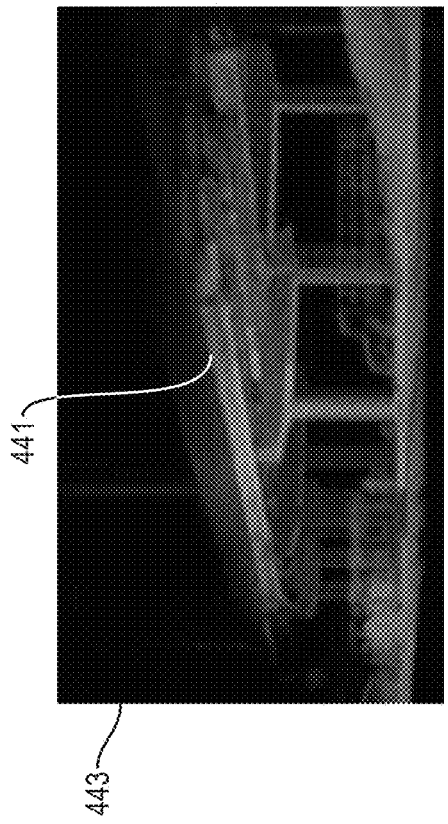
FIG. 4C is labeled version of the point cloud of FIG. 4B.

In an embodiment, acquired laser measurements are processed to create point cloud maps and estimate the lidar poses at which the data was collected. In an embodiment, the point cloud maps are created the lidar poses are estimated using the mapping methodologies as explained in Mao [43]. The Mao [43] mapping methodologies integrate laser measurements, inertial measurement unit (IMU) measurements, and other extrinsic parameters of the lidar. For reference, FIG. 4A is an image 440 of a bridge 441 and FIG. 4B is a point cloud map 442 of the bridge 441 generated using the aforementioned Mao [43] functionality. An embodiment also labels points in the point cloud map based on associated structural elements of the real-world object, e.g., the bridge 441. FIG. 4C shows a color-coded point cloud map 443 of the bridge 441, where each different point color corresponds to a different structural element of the bridge 441. Embodiments may utilize any variety of methods known to those of skill in the art to automate the process of labeling, e.g., color-coding, the point cloud data. Generally, the known methods for automatically labeling point cloud data focus on specific types of structures or infrastructure. The data examples described herein pertain to a steel girder bridge and, thus, in the examples, the object labels are computed automatically using the heuristic-based method proposed in Yan and Hajjar [44]. The proposed method of Yan and Hajjar [44] detects steel girders, which have distinctive I-shaped cross sections and, after the steel girders are detected, the Yan and Hajjar [44] method detects other structural components by leveraging the spatial relationships of the other elements with the detected steel girders. The point-level object labeling accuracy on average is 96.1% for terrestrial laser scan data and 93.3% for UAV-based laser scan data using the method of Yan and Hajjar [44].

2.1.3—Camera Calibration

Prior to data collection for crack assessment, an embodiment collects calibration images with checkerboard patterns. Such an embodiment employs a pinhole camera model, where the intrinsic parameters of the camera are calibrated using a camera calibration toolbox available from MATLAB. In such an embodiment, the intrinsic parameters are kept constant throughout data collection, including during online use of the camera and functionality described herein. Calibrated intrinsic parameters according to an example embodiment include focal length, coordinates of the optic center, and radial and tangential distortion coefficients, and are shown in Table 1.

TABLE 1

Calibrated Intrinsic Parameters For Pinhole Camera Model

|  | X | Y |
| --- | --- | --- |
| Focal length (pixels) | 6914.0 ± 14.4 | 6913.5 ± 14.6 |
| Principle point | 2040.4 ± 13.1 | 1193.4 ± 10.8 |
| Radial distortion | −0.0842 ± 0.0052 | 0.2492 ± 0.0577 |
| Tangential distortion | 0.0036 ± 0.0004 | −0.0018 ± 0.0005 |

Figure 5B:
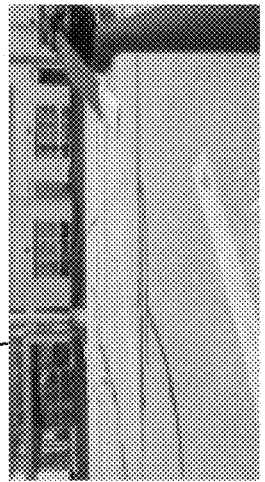
FIG. 5B is an image of the building of FIG. 5A.
Figure 5D:
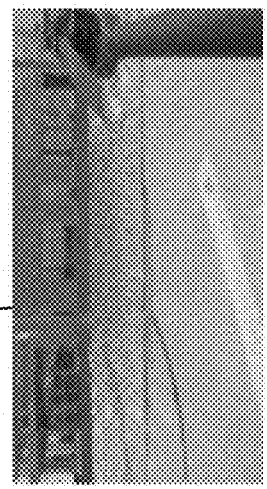
FIGS. 5C and 5D depicts alignment between an image and point cloud data according to embodiments.
Figure 5A:
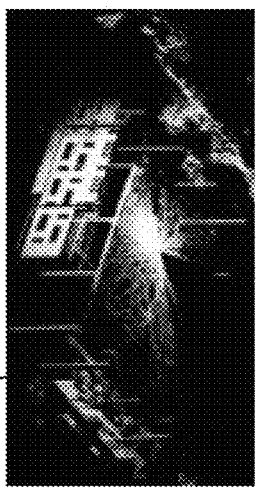
FIG. 5A is a point of building being assessed using embodiments.
Figure 5C:
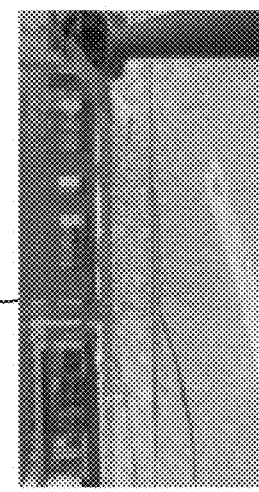

An embodiment fuses, e.g., maps, camera data with point cloud data, i.e., lidar data, based on a calibrated transformation between the lidar sensor frame and the camera frame. Because, in an embodiment, both the lidar and the camera are allowed to rotate, a mount frame is utilized for both the camera and the lidar. According to an embodiment, the mount camera frame is selected as the camera frame with a 0° yaw angle, 0° roll angle, and 10° pitch angle and the mount lidar frame is selected as the lidar frame with a 0° encoder reading (the encoder reading ranges from ranges from 0° to 360°). To calibrate a transformation matrix between the two mount frames, an embodiment takes stationary scan data from a reference object, e.g., a building façade, using both the camera and the lidar. In an embodiment, a building facade is used because it contains multiple distinct slender elements (e.g., pipes and window frames), which can be utilized to evaluate the quality of data alignment. An example of an acquired laser point cloud 550 and image 551 are shown in FIGS. 5A and 5B, respectively. Prior to calibration, a rough estimation is obtained by measuring a relative pose between the two sensors physically. Using the estimated transformation and the calibrated intrinsic parameters, acquired laser point clouds and images can be aligned as shown in FIG. 5C which depicts a view 552 of the image 551 aligned with the point cloud data 550. In an embodiment, the quality of the data alignment is inspected visually, and a transformation matrix is adjusted and refined until the lidar data 550 and image 551 pixels are well aligned as shown in the view 553 of FIG. 5D.

2.2—Lidar-Camera Registration

Through the aforementioned steps, a point cloud map with object labeling is created, and lidar poses with respect to a point cloud map at any given time are computed. The camera poses (extrinsic parameters), [R|T], at any given time, can be computed through transforming the lidar poses based on a rigid transformation between the camera frame and lidar frame. An example is shown in FIG. 6A where in the point cloud 660 the different color coding indicates different subcomponents of the bridge 661 and estimated camera poses, e.g., 662a and 662b are depicted. The example point cloud 660 data was acquired by a 148 second flight that was aimed at scanning a pier column 663 of the bridge 661 in detail. The pier column 663 is defined as the object of interest in this example and is highlighted in red. The computed camera poses, e.g., 662a-b, are also illustrated in FIG. 6A. In the next steps described hereinbelow, each acquired image is processed independently for crack assessment, starting from aligning the image with the lidar data.

According to an embodiment, given a specific image to be processed, first, a subset of the point data in the point cloud map to be aligned with the image is selected. This selected subset of point data is referred to herein as a local data map. In an embodiment, the size of the subset (local data map) is determined so as to balance resolution and accuracy of the local data map. A larger subset size typically leads to a local data map with a higher resolution, which enhances the robustness of the subsequent ROI identification. Nevertheless, a larger subset size has the potential to accumulate more mapping errors, which can reduce the accuracy in capturing the boundary of the ROI. In embodiments, the optimal subset size varies depending on specifications and configurations of the laser scanner and camera, which, amongst other examples, include the following: (1) angular resolution of the laser scanner, (2) range accuracy and noise of the laser scanner, (3) resolution of the camera, and (4) rotational speed of the laser scanner gimbal. In the examples described herein, based on sensor specifications and configurations presented in Section 2.1.1, the point data acquired within ±2 s of the timestamp of the image are utilized.

Two examples of local data maps 664a and 664b are shown in FIG. 6B. In the local data maps 664a-b the points associated with the object of interest, the pier column 663, are highlighted in red. In an example embodiment, the extrinsic and intrinsic parameters of the camera are utilized to project the point data from the local data maps 664a and 664b onto the image plane, using Equations 1-4, as shown in the views 665a and 665b of FIG. 6C. In this way, the object information extracted in the lidar data is mapped onto the images to identify the ROI (the regions 666a and 666b covered by the red points in FIG. 6C).

$$\begin{bmatrix} X_c \\ Y_c \\ Z_c \\ 1 \end{bmatrix} = [R \mid T] \begin{bmatrix} X \\ Y \\ Z \\ 1 \end{bmatrix} \quad (1)$$

$$\begin{bmatrix} x \\ y \end{bmatrix} = \begin{bmatrix} X_c/Z_c \\ Y_c/Z_c \end{bmatrix} \quad (2)$$

$$\begin{bmatrix} x_d \\ y_d \end{bmatrix} = \begin{bmatrix} x(1 + K_1 r^2 + K_2 r^4) + 2K_3 xy + K_4(r^2 + 2x^2) \\ y(1 + K_1 r^2 + K_2 r^4) + 2(r^2 + 2xy^2) + 2K_4 xy \end{bmatrix} \text{ where} \quad (3)$$

$$r^2 = x^2 + y^2$$

$$\begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} x_d \\ y_d \\ 1 \end{bmatrix} \quad (4)$$

In Equations 1-4 X, Y, and Z are the coordinates of the point data; R and T are the calibrated extrinsic parameters; $K_1$ and $K_2$ are the calibrated radial distortion coefficients; $K_3$ and $K_4$ are the calibrated tangential distortion coefficients; $f_x$ and $f_y$ are the camera focal length; $c_x$ and $c_y$ are the principle points; and u and v are the corresponding coordinates of the point data in image plane.

As can be observed in the views 665a-b of FIG. 6C, the boundaries of the ROIs are not captured accurately by the mapped point data. For example, some of the point data associated with the pier column falls outside the ROIs 666a-b. This is mainly caused by the presence of noise in the local data maps and, thus, is expected to be alleviated as the quality of lidar data improves (through, e.g., a better sensor or a more accurate mapping methodology).

FIGS. 7A-B illustrate an example of mapping high-quality lidar data acquired using a terrestrial laser scanner (TLS) onto images. The point cloud maps with object labeling and the camera poses are shown in the view 770 of FIG. 7A and two examples of the images with mapped lidar points are shown in the views 771a-b of FIG. 7B. As the noise in the TLS data is much lower than that of the UAV-based laser scanning (ULS) data (FIGS. 6A-C), FIG. 7B shows that the boundaries of the ROIs are captured with better accuracy. It is noted that the TLS data in FIGS. 7A-B is presented in this section only, in order to show the accuracy of lidar-image registration with high-quality lidar data. The functionality presented herein and the experimental results (described in U.S. Provisional Application No. 63/240,344, filed on Sep. 2, 2021 and U.S. Provisional Application No. 63/242,903 filed on Sep. 10, 2021) are based on UAV collected lidar data.

2.3—ROI Identification and Image Patch Generation

Figure 8B:
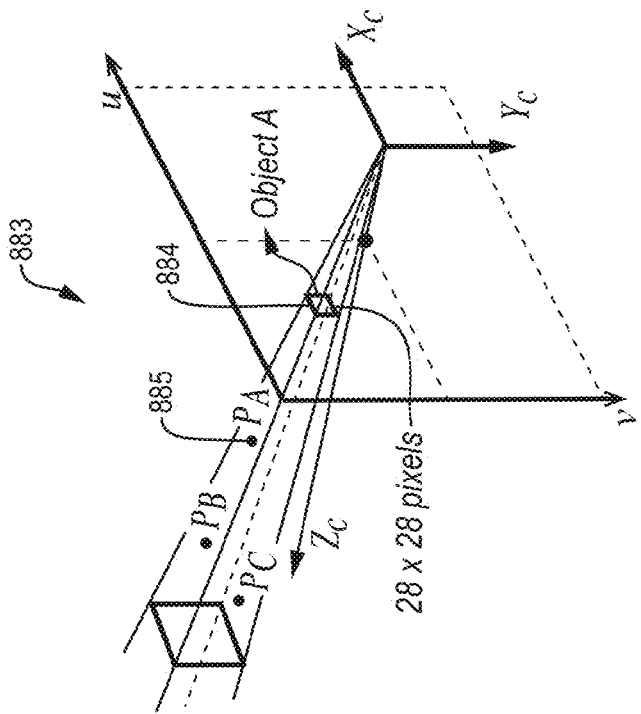
FIG. 8B illustrates a ray-tracing method utilized in embodiments to identify occluded elements of a real-world object.
Figure 8A:
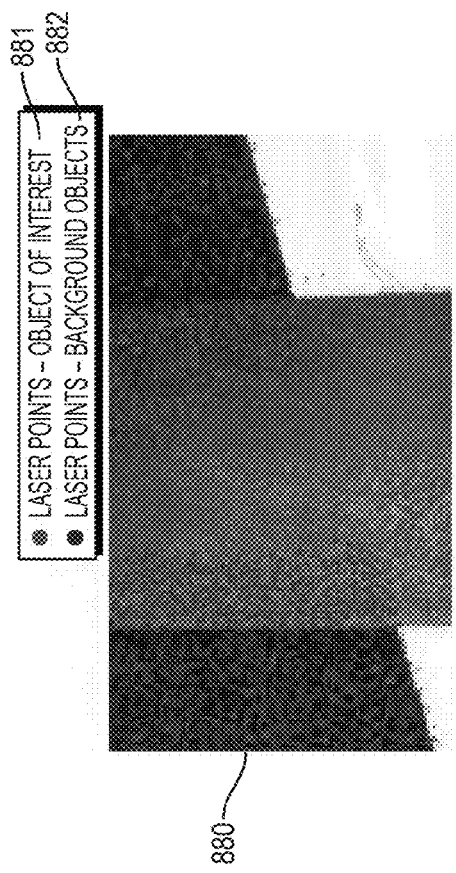
FIG. 8A is a data map showing occluded elements of a real-world object being assessed.

Local data maps often contain points associated with objects at the background, e.g., the blue points 667 in FIG. 6C. Some of these points are deemed to be occluded by the object at the foreground and, thus, are filtered out to ensure accurate identification of the ROI. An example is shown in the local data map 880 of FIG. 8A, where the red points 881 are associated with the pier column at the foreground and the blue points 882 are associated with the bridge deck and steel girders at the background. In this example, in addition to the red points 881 that are deemed to fall within the ROI (pier column), a few blue points 882 that are deemed to be occluded fall within the ROI as well. To resolve this issue, a ray-tracing strategy 883 as shown in FIG. 8B is implemented to identify the points that are deemed to be occluded. The ray-tracing strategy starts with formulating the point data in the local data map in the form of $[u,v,Z_c]$ (calculated using Equations 1-4), where u and v values are the coordinates of the point data in the image plane and $Z_c$ are values of the coordinates of the point data along the Z axis of the camera. In the ray tracing method 883, the image plane is then divided into regularly distributed grids, and the points falling inside each grid are indexed. Each grid is classified based on a label of the point with the minimum depth. An example is shown in FIG. 8B. The query grid 884 is classified as part of "Object A" (i.e., the grid 884 is labeled as being associated with object A) because the point with the minimum depth (PA 885) is associated with "Object A." In embodiments, point cloud data is mapped onto the image and each point has an associated depth. For this classification the point with minimum depth, i.e., least depth, is identified for each grid and the grid is classified based on this minimum depth. This is shown in FIG. 8B where the grid 884 includes points $P_A$, $P_B$, and $P_C$ and, where, because point $P_A$ 885 has the least depth (is shallowest), the grid 884 is classified based on this point $P_A$ 885. In an embodiment, grid size is determined based on resolution of the camera and lidar scanner. Experimental results demonstrate that an optimal grid size is 28×28 pixels given the following sensor configuration, a 12-Megapixel camera and a lidar scanner with a 0.2° angular resolution-as introduced in Section 2.1. Given lidar scanners with higher angular resolutions, a smaller grid size can be utilized so that the boundaries of the ROI can be captured more accurately. An example of the classified grids is shown in the data map 888 of FIG. 8C, where the red grids 886 are identified to be associated with the object of interest and the blue grids 887 are identified to be associated with objects at the background.

Figure 8C:
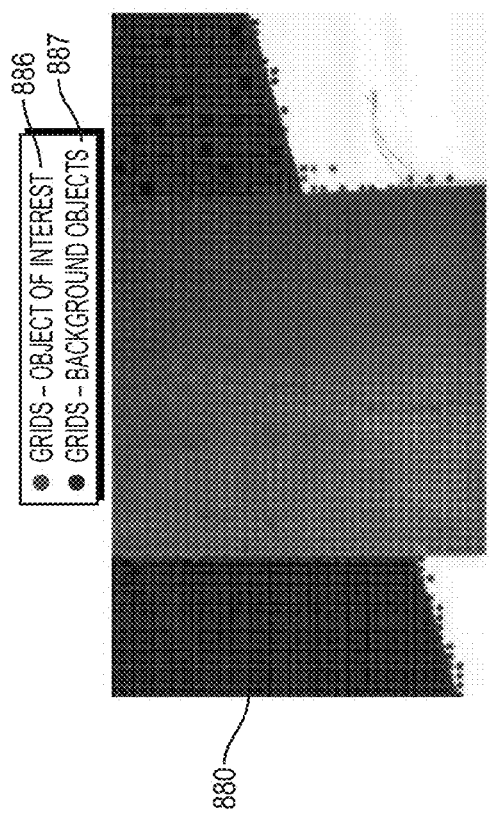
FIG. 8C illustrates results of applying the method of FIG. 8B on the data map of FIG. 8A.

In an embodiment, the grids associated with the objects of interest are utilized to extract the corresponding regions of interest in the images in order to facilitate crack recognition. In order to achieve accurate crack recognitions, the boundaries of the ROI need to be delineated accurately and be excluded from the subsequent crack recognition processes. However, due to the noise in lidar data, the resultant grids themselves are often inadequate for delineating the boundaries of the ROIs. For example, as shown in FIG. 8C, a few red grids 886, which are deemed to represent the object of interest, fall outside the corresponding ROI.

Figures 9A, 9B, 9C:
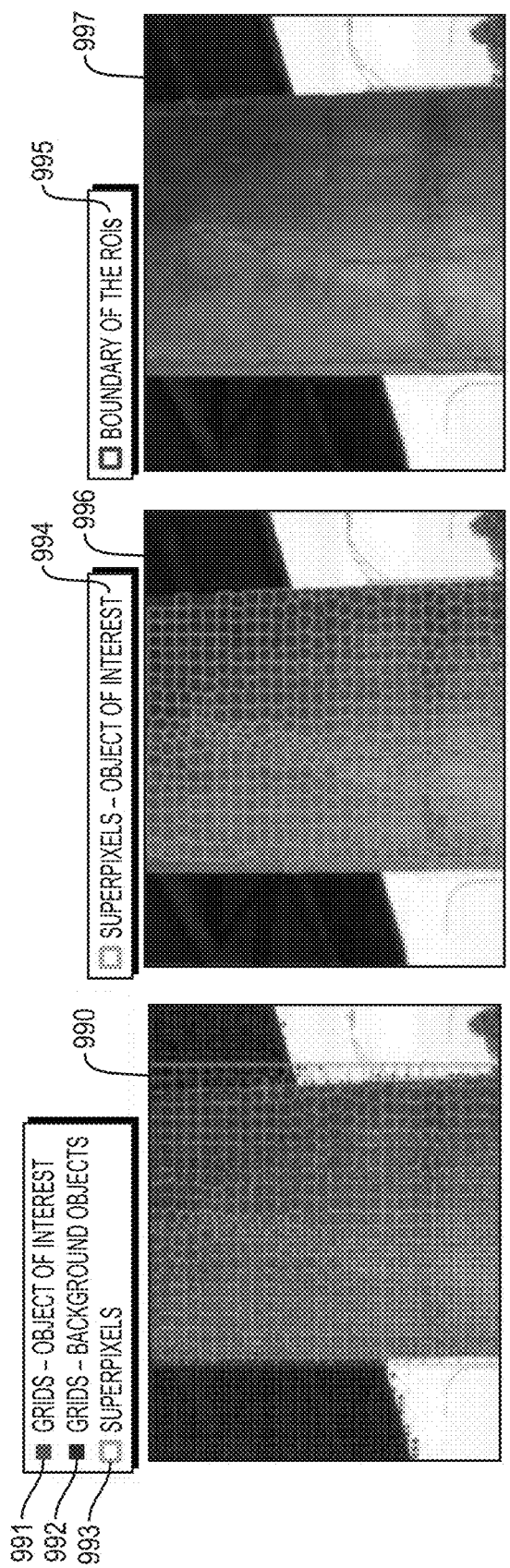
FIGS. 9A-C illustrate stages of a method for determining a region of interest (ROI) on a real-world object being examined using embodiments.

To address these inaccuracies, an embodiment applies a Simple Linear Iterative Clustering (SLICO) method [45] to oversegment the image into superpixels. The SLICO method is aimed at creating superpixels by clustering the pixels in a 5-D feature space-CIELAB color space and normalized pixel positions [L, a, b, x, y], through a K-means clustering technique. An example is shown in the view 990 of FIG. 9A which includes the grids 991 for the object of interest, grids 992 for the background object, and superpixels 993. After creating the superpixels 993, an embodiment extracts the grids 991 and 992 enclosed by each superpixel 993. The extracted grids are then processed and if all the extracted grids in a given superpixel are associated with the object of interest, the superpixel is identified to be part of the ROI, otherwise, the superpixel is identified to be part of the background. Another embodiment deems a given superpixel to be part of the object of interest if a majority of the grids in the superpixel belong to the object of interest. An example view 996 of the identified superpixels 994 within the ROI is shown in FIG. 9B. The pixels located inside the superpixels 994 are then extracted and subdivided into connected regions. All the identified superpixels are then merged to formulate the ROI of the object of interest as shown in the view 997 by the red polygon boundary line 995 of FIG. 9C.

According to an embodiment, the identified ROI, e.g., 995, is utilized to enumerate a set of candidate image patches, which are further classified into crack patches and non-crack patches using a convolutional neural network (CNN)-based classifier. To assure the effectiveness of the CNN-based classifier, the actual image pixel sizes of the candidate image patches are kept approximately equal to that of the training datasets used to train the CNN. According to an embodiment, the training datasets contain a set of labeled image patches with a fixed size of 128×128 pixels and an actual pixel size of ~0.625 mm/pixel. As such, each image patch in the training datasets covers an ~80×80 mm² area. In order to enumerate 0.625 mm/pixel candidate image patches from the UAV image, in an embodiment, the point data in the local data map are first resampled using a Robust Moving Least Squares method [46] to obtain a sample data set with a density of 50 mm. Because such an embodiment uses image patches with a size of 80 mm by 80 mm, the point cloud data is resampled to 50 mm (smaller than 80 mm) to ensure the image patches are overlapped. In this way, the ROI can be fully covered by the image patches. Through the approach explained above, the sample data are mapped onto the UAV image and are reformulated in the form of $[u^s, v^s, Z_c^s]$, where $u^s$ and $v^s$ values are the coordinates (in pixels) of the sample data in the image plane and $Z_c^s$ values are the coordinates of the data along the Z axis of the camera coordinate system. Each point in the sample data is utilized to generate one image patch that is centered at $[u^s, v^s]$. The size of the image patch $S_p$ is calculated based on $Z_c^s$:

$$S_p = \frac{f \times s}{Z_c^s}$$

where f is the camera focal length and s is the patch size in unit of measurement, which is set to 0.08 m in order to comply with the training datasets.

FIGS. 10A and 10B together show how image patches are enumerated in a ROI, e.g., ROI 995 of FIG. 9, according to an embodiment. FIG. 10A is an image 1010 with mapped laser points where the color of laser points in the image 1010 indicates depth 1011. FIG. 10B is an image 1013 illustrating identified image patches 1012, where patch size varies based on the depth information 1011 depicted in FIG. 10A. The sizes (in the unit of pixels) of the image patches 1012 varies depending on the corresponding depth information 1011 where the depth information 1011 is retrieved from the mapped laser points illustrated in FIG. 10A. The patches that are located completely in the ROI, e.g., the patches 1012 of FIG. 10B, are extracted as the candidate image patches. The candidate image patches are then resized to 128×128 pixels. In embodiments these image patches 1012 are processed by a classifier, e.g., a CNN-based classifier, to detect crack patches.

2.4—CNN-Based Classifier

Figure 11:
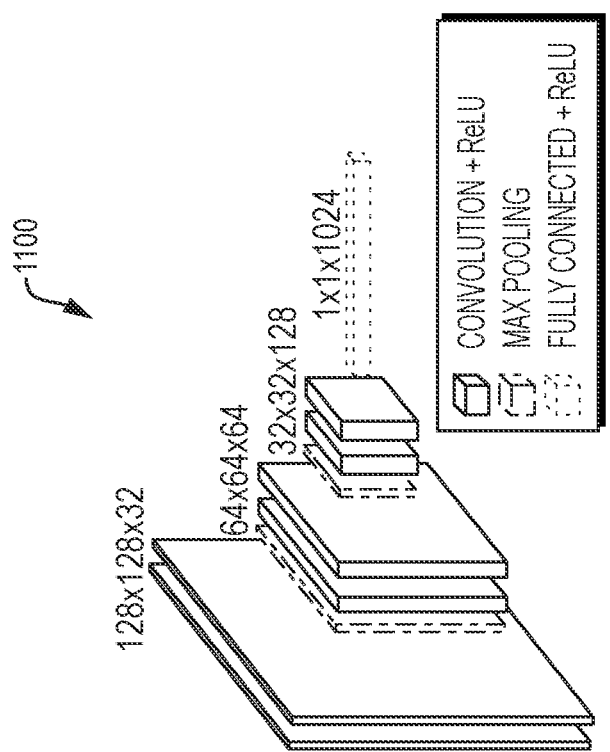
FIG. 11 is a simplified block diagram of a classifier utilized in embodiments.

A typical CNN comprises an input layer, an output layer, and multiple hidden layers. The hidden layers are normally comprised of convolutional layers, pooling layers, and fully connected layers. A variety of CNN architectures have been proposed in the literature, and they typically vary depending on the configurations of the hidden layers and the convolutional filters. Embodiments may use any variety of classifiers and architectures. In an embodiment, a simplified VGG1647 network is implemented. An example network 1100 configuration, according to an embodiment, is shown in FIG. 11. An embodiment implements stochastic gradient descent as an optimizer with a learning rate of 0.0005 and momentum of 0.9. The network 1100 is based on a TensorFlow package in Python and is trained using a desktop with Intel Core 6700HQ 3.5 GHz CPU, 32 GB RAM, and Nvidia Titan XP GPU. According to an embodiment, the batch size is set to 150, and the number of epochs is set to be 100. In an example implementation, the training process converges at epoch #65 and results in a training accuracy of 96.84% and a validation accuracy of 95.25%.

In an embodiment, the training datasets, image patches with ground truth labels, are obtained from three sources: (1) 5876 crack patches and 8685 non-crack patches with a size of 256×256 pixels from the SDNET-2018 dataset [48] which cover microsize cracks on clean concrete surfaces; (2) 20,000 crack patches and 20,000 non-crack patches with a size of 227×227 pixels from the METU dataset [49] which cover concrete cracks with varying crack widths on clean concrete surfaces; and (3) 13,021 crack patches and 19,867 non-crack patches with a size of 384×384 pixels that were collected. This newly collected dataset (3) covers concrete cracks with more complex background textures such as rusts, water stains, and concrete efflorescence. In an embodiment, these image patches are resized to 128×128 prior to the training process and 80% of the patches are used for training, and the rest (20%) are used for validation.

2.5—Pixel-Level Crack Detection

Figure 12:
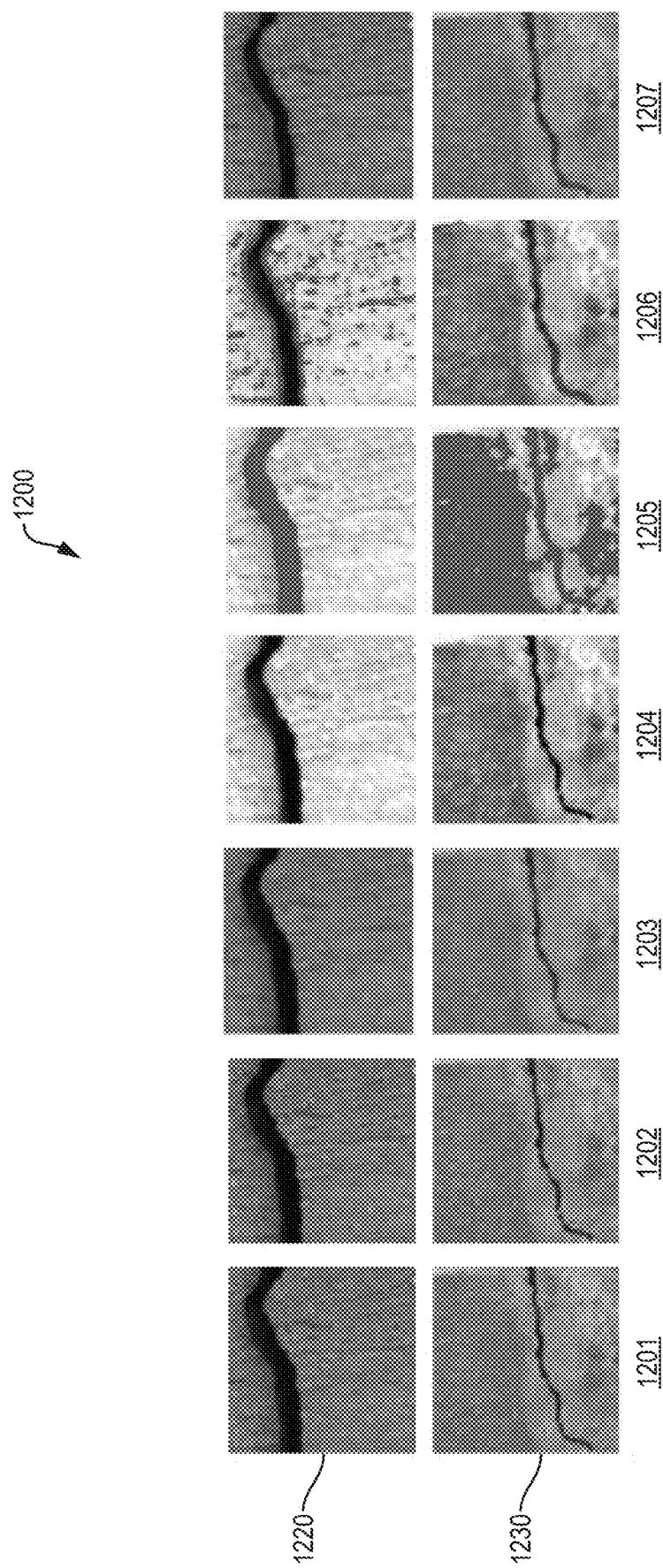
FIG. 12 depicts steps of crack boundary extraction according to an embodiment.

Once crack patches are identified, the crack patches are processed independently by an adaptive thresholding process to extract pixels representing crack boundaries. An example of step-by-step procedure 1200 of the crack boundary extraction according to an embodiment is shown in FIG. 12 for two different crack patches 1220 and 1230. The method 1200 begins at 1201 with the crack patches 1220 and 1230. Next, RGB values of pixels of the patches 1220 and 1230 are converted to grayscale intensities as shown at step 1202. A Gaussian smoothing filter and contrast-limited adaptive histogram equalization [50] are then applied to reduce the noise in the crack patch (1203) and to enhance the contrast of the crack patch (1204). Thereafter, the resultant crack patches are binarized based on grayscale intensity using an Otsu's thresholding method [51] which is aimed at computing an optimal intensity threshold by minimizing intraclass variances. The group of pixels with an intensity value lower than the threshold, $P_I$, is identified as shown by the red points (1205). To continue, a Sobel operator is applied and the gradient magnitudes of the grayscale intensity of the enhanced crack patches are computed. The crack patch is binarized again based on the gradient magnitudes using the Otsu's method and the group of pixels with a gradient magnitude higher than the threshold, $P_G$, are then recorded, as illustrated by red points at (1206). Finally, the group of pixels in the intersection of $P_I$ and $P_G$ are extracted as the pixels representing the crack boundary (1207).

Once the crack boundaries are extracted from a crack patch, the pixels identified in the crack patch are mapped onto the corresponding location in the input image. This is illustrated in FIG. 13A, where the image 1330 shows the crack pixels 1331. The pixels 1331 identified in the crack patch are also aggregated to generate a binary image 1330. To illustrate, before generating the binary image 1330, crack boundaries are extracted in each crack patch, and, to generate the binary image 1330, the crack boundaries (in the crack patches) are mapped onto the original image and combined. Morphological closing operation, which includes a dilation followed by an erosion using an identical structuring element, is then carried out on the binary image to (i) unify possible discrete parts of a crack and (ii) identify pixels located inside the cracks. This is illustrated in the image 1332 of FIG. 13B where the identified pixels 1333 are illustrated. Thereafter, the identified pixels are clustered into individual crack instances using the connected-component labeling technique [52]. The crack instances are then refined by exploiting (i) the geometric characteristics of the cracks, e.g., their shapes are normally thinner than other objects, or (ii) textural patterns. The circularity of each candidate crack instance is then computed as follows [53]:

$$\text{Circularity} = \frac{4 \times C}{\pi \times L^2}$$

where C is the number of crack pixels in the candidate crack instance and L is the maximum length of the region. According to an embodiment, for an object formed by a set of image pixels, the circularity measures how close the shape of the object is to a perfect circle. Experiments indicate that a circularity threshold equal to 0.12 achieve good performance in distinguishing actual cracks from other textural patterns. This circularity threshold is also implemented and verified through experiments as described in U.S. Provisional Application No. 63/240,344, filed on Sep. 2, 2021 and U.S. Provisional Application No. 63/242,903 filed on Sep. 10, 2021. An example of results of a circularity check are shown in the image 1334 of FIG. 13C. In the image 1334 the regions with a circularity smaller than the threshold are identified to be associated with actual cracks (green pixels 1335 in FIG. 13C). Otherwise, the regions are identified as being associated with other objects or textural patterns and, thus, are filtered out (red pixels, e.g., 1336, in FIG. 13C).

2.6—Crack Quantification

Figure 14B:
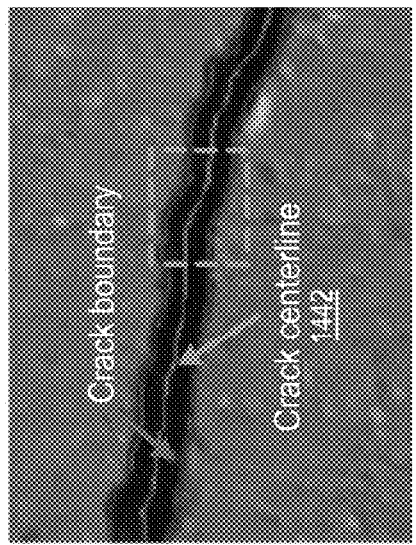
FIGS. 14A-C are images illustrating steps of a crack size quantification technique utilized in embodiments.
Figure 14C:
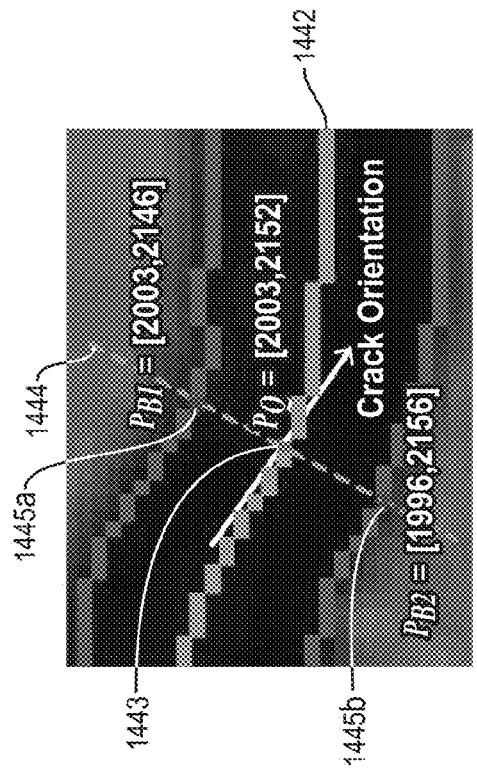
Figure 14A:
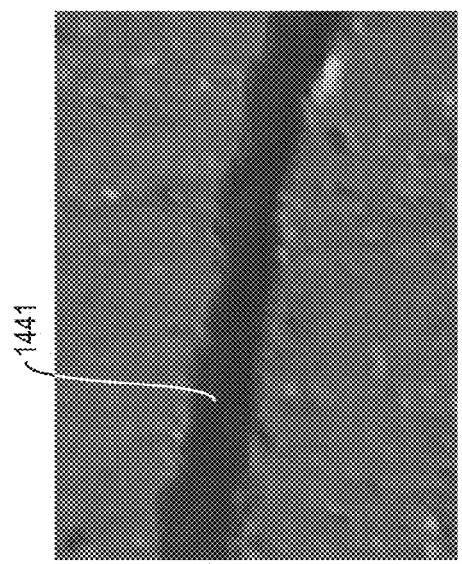

An embodiment quantifies detected cracks by skeletonizing each crack instance using a medial axis thinning methodology [54] to extract a one-pixel-wide centerline. To illustrate, FIG. 14A shows identified crack pixels 1441 and FIG. 14B illustrates a crack centerline 1442. An embodiment calculates the crack length in pixels directly by counting the pixels on the centerline. Since width of a crack often varies along the crack, crack width is evaluated at each pixel on the centerline. For a query pixel on the crack centerline, the crack width is computed as shown in FIG. 14C. Assuming the query pixel is 1443 $P_Q=[2000,2152]$, the crack width is calculated as follows: (1) the orientation of the crack at $P_Q$ 1443 is calculated by fitting a line to the pixel 1443 and its neighboring pixels on the centerline 1442; (2) a line 1444 normal to the crack orientation is then created; (3) at both sides of the crack centerline 1442, the crack boundary pixel 1445a-b that is closest to the centerline 1442 is extracted; (4) the distance between the two pixels, PB1 1445a and PB2 1445b, are calculated as the crack width in pixels.

An embodiment quantifies crack length and width in units of measurement by estimating actual pixel sizes using the mapped lidar data. Given the depths of the mapped lidar data (Equation 1) $Z_c$, the actual pixel sizes can be estimated as follows:

$$\text{actual pixel size (mm/pixel)} = \frac{Z_c(\text{mm})}{f(\text{pixel})}$$

where f is the focal length in pixels. An example of the mapped lidar data with estimated pixel sizes is shown in FIG. 15A where the pixel size is shown in the image 1551 in accordance with the color coding scale 1550. An embodiment further smooths the estimated pixel sizes using a moving average process and these smoothed pixel sizes are then processed using a scattered data interpolation method [55] to formulate an interpolant with C1 continuity:

$$\text{actual pixel size} = F(u,v)$$

Figure 15B:
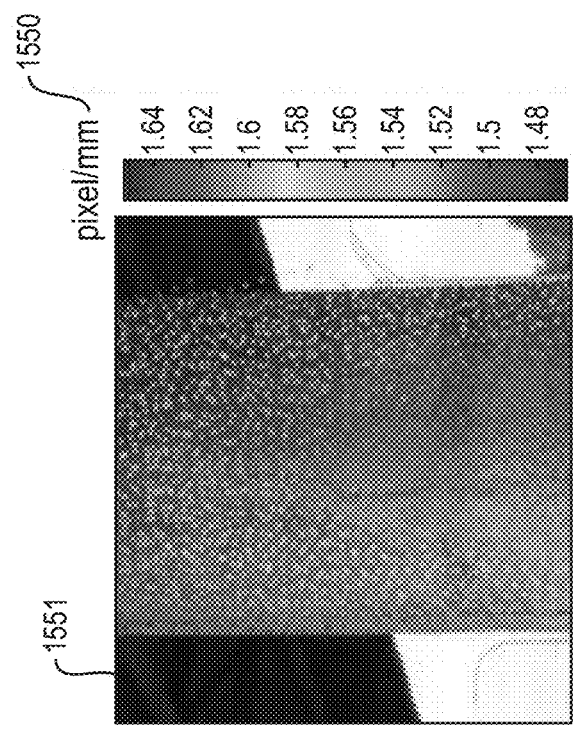
FIGS. 15A-B illustrate determinations of pixel sizes according to embodiments.
Figure 15A:
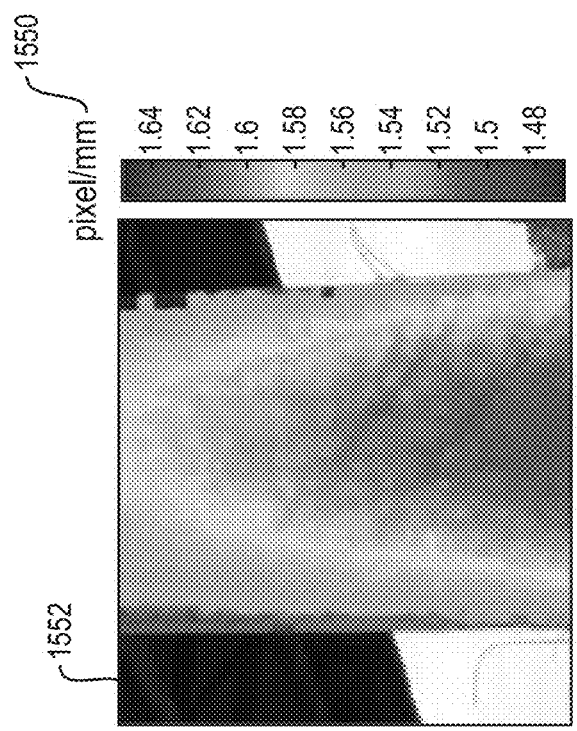

An example of the resultant interpolant is shown in FIG. 15B where the pixel sizes are shown in the image 1552 in accordance with the scale 1550. Further, the distance between two pixels can be calculated using line integral as follows:

$$d(mm) = \int_C F(u,v) ds$$

where $s = \sqrt{dx^2 + dy^2}$ and C is the line segment between the two pixels (e.g., $P_{B1}$ (1445a) and $P_{B2}$ (1445b)) in FIG. 14C.

3—RESULTS

Embodiments provide a novel approach to automate detection and quantification of concrete cracks. Embodiments can be used with any camera and point cloud data. Advantageously, embodiments can automatically process noisy camera and point cloud data collected via unmanned aircraft systems to detect and quantify cracks. Embodiments advance state-of-the-art UAV-based crack assessment methods by taking advantage of both high-resolution RGB images and three-dimensional lidar data. Provided a small number of parameter values calibrated based on the implemented lidar and camera system (the system that collects the data), embodiments automatically detect the concrete cracks in each structural element as well as quantify the detected cracks in units of measurement. In embodiments, cracks are mainly recognized through a hybrid crack detector, a CNN-based classifier for recognizing cracks at the patch-level followed by a feature-based crack detector for recognizing cracks at the pixel-level. Lidar data are augmented for two main purposes: (1) to identify the ROIs associated with individual structural elements so as to facilitate the crack recognition and (2) to estimate the actual image pixel sizes to improve the crack recognition process as well as to enable crack quantification.

To validate the effectiveness of embodiments, a UAV equipped with a DJI Zenmuse Z3 camera and a Velodyne VLP-16 lidar scanner was developed and was employed to acquire data from the substructure elements of an in-service steel girder bridge where multiple cracks could be observed. The accuracy of embodiments was evaluated quantitatively through comparing the computed results to manually annotated images and physical measurements. The results, as fully described and illustrated in U.S. Provisional Application No. 63/240,344, filed on Sep. 2, 2021 and U.S. Provisional Application No. 63/242,903 filed on Sep. 10, 2021, indicate that embodiments can recognize crack pixels with an accuracy of 85% on average as well as quantify recognized concrete cracks with an error less than 10%.

4—COMPUTER SUPPORT

Figure 16:
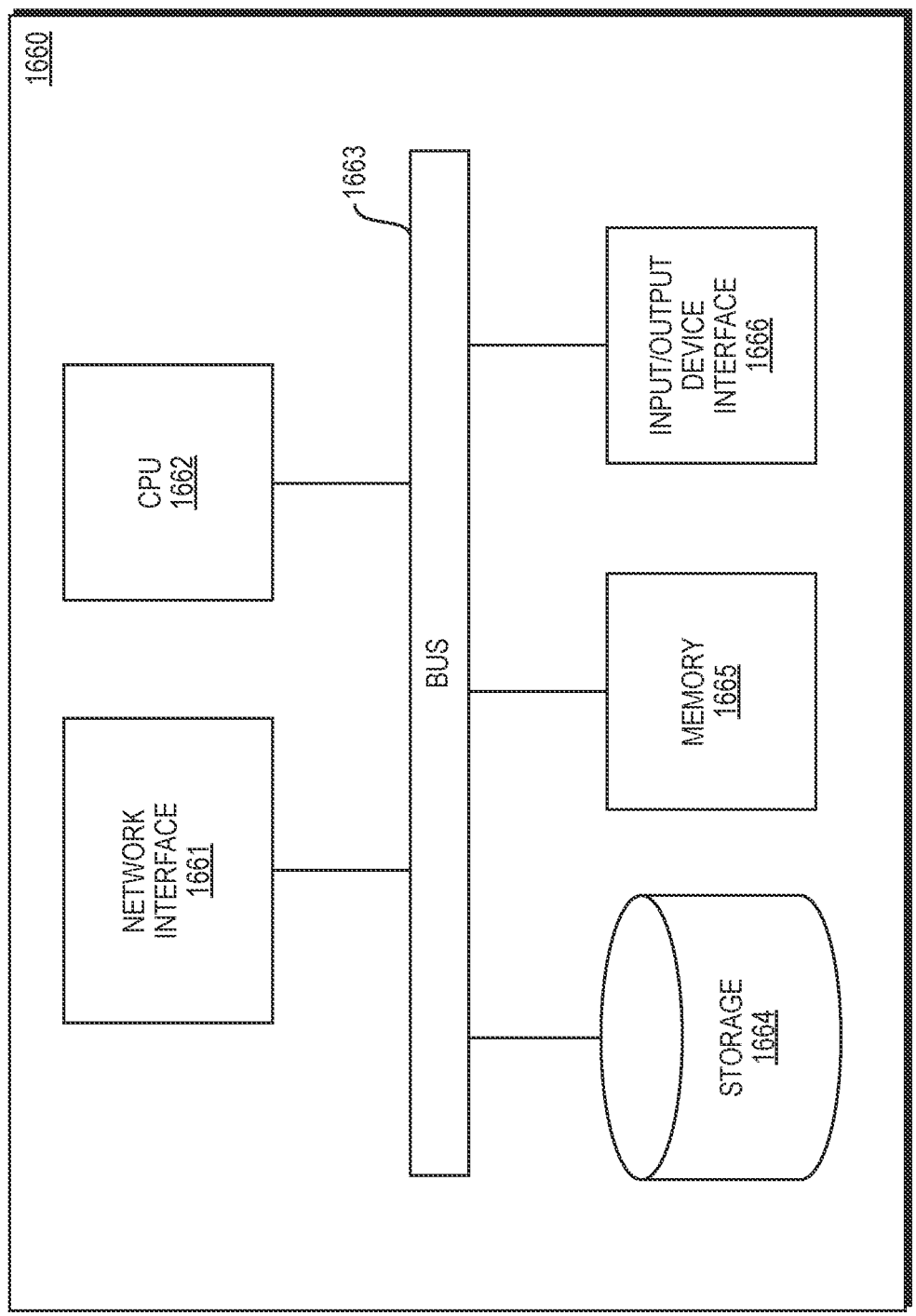
FIG. 16 is a simplified block diagram of a computer system embodiment for assessing cracks.

FIG. 16 is a simplified block diagram of a computer-based system 1660 that may be used to implement any variety of the embodiments of the present invention described herein. The system 1660 comprises a bus 1663. The bus 1663 serves as an interconnect between the various components of the system 1660. Connected to the bus 1663 is an input/output device interface 1666 for connecting various input and output devices such as a keyboard, mouse, display, speakers, etc. to the system 1660. A central processing unit (CPU) 1662 is connected to the bus 1663 and provides for the execution of computer instructions implementing embodiments. Memory 1665 provides volatile storage for data used for carrying out computer instructions implementing embodiments described herein, such as those embodiments previously described hereinabove. Storage 1664 provides non-volatile storage for software instructions, such as an operating system (not shown) and embodiment configurations, etc. The system 1660 also comprises a network interface 1661 for connecting to any variety of networks known in the art, including wide area networks (WANs) and local area networks (LANs).

It should be understood that the example embodiments described herein may be implemented in many different ways. In some instances, the various methods and systems described herein may each be implemented by a physical, virtual, or hybrid general purpose computer, such as the computer system 1660, or a computer network environment such as the computer environment 1770, described herein below in relation to FIG. 17. The computer system 1660 may be transformed into the systems that execute the methods described herein, for example, by loading software instructions into either memory 1665 or non-volatile storage 1664 for execution by the CPU 1662. One of ordinary skill in the art should further understand that the system 1660 and its various components may be configured to carry out any embodiments or combination of embodiments of the present invention described herein. Further, the system 1660 may implement the various embodiments described herein utilizing any combination of hardware, software, and firmware modules operatively coupled, internally, or externally, to the system 1660.

Figure 17:
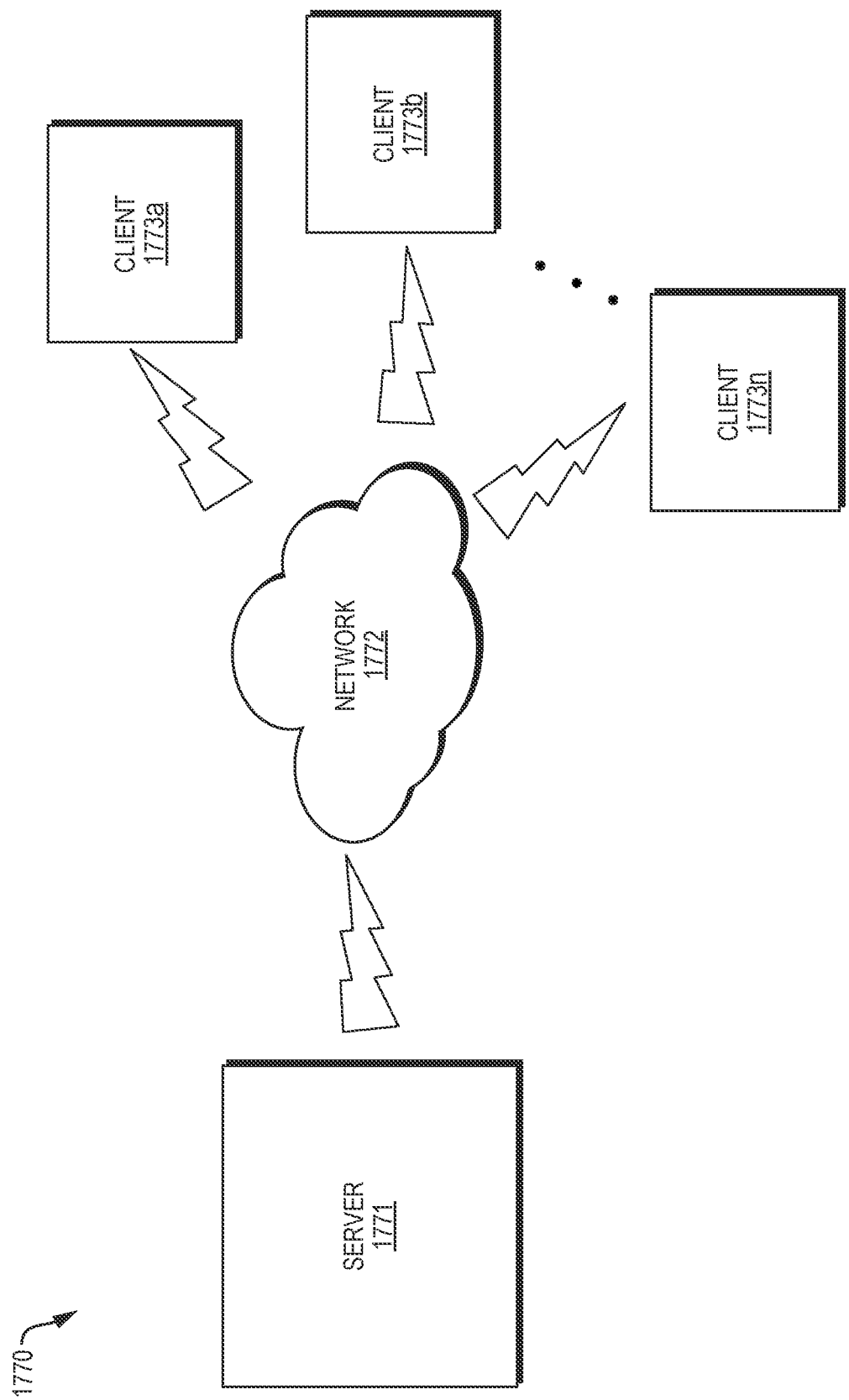
FIG. 17 is a simplified diagram of a computer network environment in which an embodiment of the present invention may be implemented.

FIG. 17 illustrates a computer network environment 1770 in which an embodiment of the present invention may be implemented. In the computer network environment 1770, the server 1771 is linked through the communications network 1772 to the clients 1773a-n. The environment 1770 may be used to allow the clients 1773a-n, alone or in combination with the server 1771, to execute any of the embodiments described herein. For non-limiting example, computer network environment 1770 provides cloud computing embodiments, software as a service (SAAS) embodiments, and the like.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus, the data processors described herein are intended for purposes of illustration only and not as a limitation of the embodiments.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

5—REFERENCES

1. ASCE. 2017 Infrastructure report card. Report ASCE. Reston, VA; 2017.
2. Lattanzi D, Miller G. Review of robotic infrastructure inspection systems. *J Inf Syst.* 2017; 23(3):04017004. https://doi.org/10.1061/(asce) is.1943-555x.0000353
3. Charron N, McLaughlin E, Phillips S, Goorts K, Narasimhan S, Waslander S L. Automated bridge inspection using mobile ground robotics. *J Struct Eng.* 2019; 145(11):04019137. https://doi.org/10.1061/(asce)st.1943-541x.0002404
4. Gibb S, La H M, Le T, Nguyen L, Schmid R, Pham H. Nondestructive evaluation sensor fusion with autonomous robotic system for civil infrastructure inspection. *J Field Robot.* 2018; 35(6):988-1004. https://doi.org/10.1002/rob.21791

5. La H M, Dinh T H, Pham N H, Ha Q P, Pham A Q. Automated robotic monitoring and inspection of steel structures and bridges. *Robotica.* 2018; 37(5):947-967. https://doi.org/10.1017/s0263574717000601
6. Guimaraes M, Lindberg J. Remote controlled vehicle for inspection of vertical concrete structures. *Proceedings of the 3rd International Conference on Applied Robotics for the Power Industry.* Foz do Iguassu, Brazil; 2014.
7. Ham Y, Han K K, Lin J J, Golparvar-Fard M. Visual monitoring of civil infrastructure systems via camera-equipped unmanned aerial vehicles (UAVs): A review of related works. *Vis Eng.* 2016; 4(1):1-8. https://doi.org/10.1186/s40327-015-0029-z
8. Ellenberg A, Kontsos A, Moon F, Bartoli I. Bridge deck delamination identification from unmanned aerial vehicle infrared imagery. *Autom Constr.* 2016; 72:155-165. https://doi.org/10.1016/j.autcon.2016.08.024
9. Yan Y, Guider B, Yoder L, Kasireddy V, Huber D, Scherer S, Akinci B, Hajjar J F. Automated damage detection and structural modeling with laser scanning. *Proceedings of the Annual Stability Conference Structural Stability Research Council.* Orlando, Florida; 2016.
10. Laefer D F, Truong-Hong L. Toward automatic generation of 3d steel structures for building information modelling. *Autom Constr.* 2017; 74:66-77. https://doi.org/10.1016/j.autcon.2016.11.011
11. Lu R, Brilakis I, Middleton C R. Detection of structural components in point clouds of existing rc bridges. *Comput Aided Civ Inf Eng.* 2019; 34(3):191-212. https://doi.org/10.1111/mice.12407
12. Riveiro B, DeJong M J, Conde B. Automated processing of large point clouds for structural health monitoring of masonry arch bridges. *Autom Constr.* 2016; 72:258-268. https://doi.org/10.1016/j.autcon.2016.02.009
13. Guldur Erkal B, Hajjar J F. Laser-based surface damage detection and quantification using predicted surface properties. *Autom Constr.* 2017; 83:285-302. https://doi.org/10.1016/j.autcon.2017.08.004
14. German S, Brilakis I, DesRoches R. Rapid entropy-based detection and properties measurement of concrete spalling with machine vision for post-earthquake safety assessments. *Adv Eng Inform.* 2012; 26(4):846-858. https://doi.org/10.1016/j.aei.2012.06.005
15. Truong-Hong L, Laefer D F, Hinks T, Carr H. Combining an angle criterion with voxelization and the flying voxel method in reconstructing building models from lidar data. *Comput Aided Civ Inf Eng.* 2013; 28(2):112-129. https://doi.org/10.1111/j.1467-8667.2012.00761.x
16. Koch C, Georgieva K, Kasireddy V, Akinci B, Fieguth P. A review on computer vision based defect detection and condition assessment of concrete and asphalt civil infrastructure. *Adv Eng Inform.* 2015; 29(2):196-210. https://doi.org/10.1016/j.aei.2015.01.008
17. Momtaz Dargahi M, Khaloo A, Lattanzi D. Color-space analytics for damage detection in 3D point clouds. *Struct Infrastruct Eng.* 2021:1-14. https://doi.org/10.1080/15732479.2021.1875488
18. Oskouie P, Becerik-Gerber B, Soibelman L. Automated measurement of highway retaining wall displacements using terrestrial laser scanners. *Autom Constr.* 2016; 65:86-101. https://doi.org/10.1016/j.autcon.2015.12.023
19. Liu W, Chen S-E, Hasuer E. Bridge clearance evaluation based on terrestrial lidar scan. *J Perform Constr Facil.* 2012; 26(4):469-477. https://doi.org/10.1061/(asce)cf.1943-5509.0000208
20. Cabaleiro M, Lindenbergh R, Gard W F, Arias P, van de Kuilen J W G. Algorithm for automatic detection and analysis of cracks in timber beams from lidar data. *Construct Build Mater.* 2017; 130:41-53. https://doi.org/10.1016/j.conbuildmat.2016.11.032
21. Laefer D F, Truong-Hong L, Carr H, Singh M. Crack detection limits in unit based masonry with terrestrial laser scanning. *NDT & E Int.* 2014; 62:66-76. https://doi.org/10.1016/j.ndteint.2013.11.001
22. Greenwood W W, Lynch J P, Zekkos D. Applications of UAVs in civil infrastructure. *J Inf Syst.* 2019; 25(2): 04019002. https://doi.org/10.1061/(asce)is.1943-555x.0000464
23. Xie Y, Jiaojiao T, Zhu X. Linking points with labels in 3D: A review of point cloud semantic segmentation. *IEEE Trans Geosci Remote Sens.* 2020; 8(4):38-59. https://doi.org/10.1109/MGRS.2019.2937630
24. Ellenberg A, Kontsos A, Moon F, Bartoli I. Bridge related damage quantification using unmanned aerial vehicle imagery. *Struct Control Health Monit.* 2016; 23(9):1168-1179. https://doi.org/10.1002/stc.1831
25. Lei B, Wang N, Xu P, Song G. New crack detection method for bridge inspection using UAV incorporating image processing. *J Aerosp Eng.* 2018; 31(5):04018058. https://doi.org/10.1061/(asce)as.1943-5525.0000879
26. Abdel-Qader I, Abudayyeh O, Kelly M E. Analysis of edge-detection techniques for crack identification in bridges. *J Comput Civ Eng.* 2003; 17(4):255-263. https://doi.org/10.1061/(asce)0887-3801(2003)17:4(255)
27. Dorafshan S, Thomas R J, Maguire M. Comparison of deep convolutional neural networks and edge detectors for image-based crack detection in concrete. *Construct Build Mater.* 2018; 186:1031-1045. https://doi.org/10.1016/j.conbuildmat.2018.08.011
28. Yeum C M, Dyke S J. Vision-based automated crack detection for bridge inspection. *Comput Aided Civ Inf Eng.* 2015; 30(10):759-770. https://doi.org/10.1111/mice.12141
29. Liu X, Ai Y, Scherer S. Robust image-based crack detection in concrete structure using multi-scale enhancement and visual features. *Proceedings of the 2017 IEEE International Conference on Image Processing* (ICIP). 2017.
30. Yamaguchi T, Hashimoto S. Fast crack detection method for large-size concrete surface images using percolation-based image processing. *Mach Vis Appl.* 2009; 21(5):797-809. https://doi.org/10.1007/s00138-009-0189-8
31. Nishikawa T, Yoshida J, Sugiyama T, Fujino Y. Concrete crack detection by multiple sequential image filtering. *Comput Aided Civ Inf Eng.* 2012; 27(1):29-47. https://doi.org/10.1111/j.1467-8667.2011.00716.x
32. Cha Y-J, Choi W, Biiyilkortiirk 0. Deep learning-based crack damage detection using convolutional neural networks. *Comput Aided Civ Inf Eng.* 2017; 32(5):361-378. https://doi.org/10.1111/mice.12263
33. Chen F-C, Jahanshahi M R. NB-CNN: Deep learning-based crack detection using convolutional neural network and naive Bayes data fusion. *IEEE Trans Ind Electron.* 2018; 65(5):4392-4400. https://doi.org/10.1109/tie.2017.2764844
34. Liang X. Image-based post-disaster inspection of reinforced concrete bridge systems using deep learning with bayesian optimization. *Comput Aided Civ Inf Eng.* 2018; 34(5):415-430. https://doi.org/10.1111/mice.12425
35. Xu Y, Wei S, Bao Y, Li H. Automatic seismic damage identification of reinforced concrete columns from images by a region-based deep convolutional neural network. *Struct Control Health Monit.* 2019; 26(3):e2313. http://doi.org/10.1002/stc.2313

36. Kim B, Cho S. Image-based concrete crack assessment using mask and region-based convolutional neural network. *Struct Control Health Monit.* 2019; 26(8):e2381. https://doi.org/10.1002/stc.2381
37. Lee J S, Hwang S H, Choi I Y, Choi Y. Estimation of crack width based on shape-sensitive kernels and semantic segmentation. *Struct Con-trol Health Monit.* 2020; 27(4):e2504. https://doi.org/10.1002/stc.2504
38. Alipour M, Harris D K, Miller G R. Robust pixel-level crack detection using deep fully convolutional neural networks. *J Comput Civ Eng.* 2019; 33(6):04019040. https://doi.org/10.1061/(asce)cp.1943-5487.0000854
39. Dung C V, Anh L D. Autonomous concrete crack detection using deep fully convolutional neural network. *Autom Constr.* 2019; 99:52-58. https://doi.org/10.1016/j.autcon.2018.11.028
40. Yan Y, Haijar J F. Automated damage assessment and structural modeling of bridges with visual sensing technology. Report No. NEU-CEE-2021-01. Department of Civil and Environmental Engineering, Northeastern University; Boston, Massachusetts; 2021:589 pp.
41. Bhowmick S, Nagarajaiah S, Veeraraghavan A. Vision and deep learning-based algorithms to detect and quantify cracks on concrete sur-faces from UAV videos. *Sensors (Basel).* 2020; 20(21):6299. https://doi.org/10.3390/s20216299
42. McLaughlin E, Charron N, Narasimhan S. Automated defect quantification in concrete bridges using robotics and deep learning. *J Comput Civ Eng.* 2020; 34(5): 04020029. https://doi.org/10.1061/(asce)cp.1943-5487.0000915
43. Mao Z, Yan Y, Wu J, Haijar J F, Padir T. Automated damage assessment of critical infrastructure using online mapping technique with small unmanned aircraft systems. *Proceedings of the 2019 IEEE International Symposium on Technologies for Homeland Security (HST).* 2019.
44. Yan Y, Haijar J F. Automated extraction of structural elements in steel girder bridges from laser point clouds. *Autom Constr.* 2021; 125: 103582. https://doi.org/10.1016/j.autcon.2021.103582
45. Achanta R, Shaji A, Smith K, Lucchi A, Fua P, Süsstrunk S. Slic superpixels. Report 2010.
46. Rusu R B. Semantic 3D object maps for everyday manipulation in human living environments. *KI—Künstliche Intelligenz.* 2010; 24(4):345-348. https://doi.org/10.1007/s13218-010-0059-6
47. Simonyan K, Zisserman A. Very deep convolutional networks for large-scale image recognition. arXiv preprint arXiv:1409.1556. 2014. https://arxiv.org/pdf/1409.1556.pdf
48. Maguire M, Dorafshan S, Thomas R J. (2018). *Sdnet2018: A concrete crack image dataset for machine learning applications*, Utah State University, Retrieved from: https://digitalcommons.usu.edu/all_datasets/48/
49. Zhang L, Yang F, Zhang Y D, Zhu Y J. Road crack detection using deep convolutional neural network, 2016 *IEEE International Conference on Image Processing (ICIP).* Phoenix, AZ, USA; September 25-28, 2016.
50. Reza A M. Realization of the contrast limited adaptive histogram equalization (clahe) for real-time image enhancement. *J VLSI Signal Process Syst Signal Image Video Technol.* 2004; 38(1):35-44. https://doi.org/10.1023/b:Vlsi.0000028532.53893.82
51. Otsu N. A threshold selection method from gray-level histograms. *IEEE Trans Syst Man Cybern.* 1979; 9(1):62-66. https://doi.org/10.1109/tsmc.1979.4310076
52. Dillencourt M B, Samet H, Tamminen M. A general approach to connected-component labeling for arbitrary image representations. *JACM.* 1992; 39(2):253-280. https://doi.org/10.1145/128749.128750
53. Yamaguchi T, Nakamura S, Saegusa R, Hashimoto S. Image-based crack detection for real concrete surfaces. *IEEJ Trans Electr Electron Eng.* 2008; 3(1):128-135. https://doi.org/10.1002/tee.20244
54. Lee T C, Kashyap R L, Chu C N. Building skeleton models via 3D medial surface axis thinning algorithms. *CVGIP.* 1994; 56(6):462-478. https://doi.org/10.1006/cgip.1994.1042
55. Amidror I. Scattered data interpolation methods for electronic imaging systems: A survey. *J Electron Imaging.* 2002; 11(2):157-176. https://doi.org/10.1117/1.1455013

What is claimed is:

1. A computer-implemented method for automatically assessing cracks in real-world objects, the method comprising:
   mapping pixels in an image of a real-world object to corresponding points in point cloud data of the real-world object, wherein the point cloud data is light detection and ranging (LIDAR) data captured by a LIDAR sensor, the image is captured by a camera, and the mapping is based on (i) a transformation between a reference frame of the camera and a reference frame of the LIDAR sensor, (ii) a pose of the camera when capturing the image, and (iii) a pose of the LIDAR sensor when capturing the LIDAR data;
   identifying a patch in the image data including a crack by processing the pixels with the corresponding points mapped using a classifier;
   based on one or more features of the image, identifying pixels in the patch corresponding to the crack; and
   using the identified pixels in the patch corresponding to the crack, determining real-world dimensions of the crack.

2. The method of claim 1 further comprising:
   capturing the LIDAR data and the image via mounting the LIDAR sensor and the camera on an unmanned aerial vehicle (UAV).

3. The method of claim 1 wherein the one or more features of the image include at least one of pixel intensity values and pixel intensity gradients.

4. The method of claim 1 wherein identifying the pixels in the patch corresponding to the crack comprises at least one of:
   identifying pixels in the patch with an intensity below a threshold as the pixels corresponding to the crack; and
   identifying pixels in the patch with an intensity gradient above a threshold as boundary outline pixels of the crack.

5. The method of claim 4 further comprising:
   determining an intensity distribution of the patch; and
   setting a given threshold adaptively based on the determined intensity distribution.

6. The method of claim 1 wherein identifying the pixels in the patch corresponding to the crack comprises:
   identifying pixels in the patch forming a boundary outline of the crack; and
   identifying pixels within the boundary outline;
   wherein the identified pixels in the patch forming the boundary outline of the crack and the identified pixels within the boundary outline are the pixels in the patch corresponding to the crack.

7. The method of claim 1 wherein the image is a sub-image of a main-image, and the method further comprises: identifying the sub-image.

8. The method of claim 7 wherein the sub-image includes a support member of the real-world object.

9. The method of claim 1 wherein the real-world object is a bridge, a building, a steel structure, or a concrete structure.

10. The method of claim 1 wherein the classifier is a convolutional neural network (CNN) trained to identify portions of images containing one or more cracks.

11. The method of claim 1 wherein determining real-world dimensions of the crack using the identified pixels in the patch corresponding to the crack comprises:
for each identified pixel in the patch corresponding to the crack: (i) determining depth of the pixel based on a corresponding point in the point cloud data mapped to the pixel and (ii) determining real-world area of the real-world object represented by the pixel using the determined depth of the pixel.

12. A computer system for automatically assessing cracks in real-world objects, the system comprising:
a processor; and
a memory with computer code instructions stored thereon, the processor and the memory, with the computer code instructions, being configured to cause the system to:
map pixels in an image of a real-world object to corresponding points in point cloud data of the real-world object, wherein the point cloud data is light detection and ranging (LIDAR) data captured by a LIDAR sensor, the image is captured by a camera, and the mapping is based on (i) a transformation between a reference frame of the camera and a reference frame of the LIDAR sensor, (ii) a pose of the camera when capturing the image, and (iii) a pose of the LIDAR sensor when capturing the LIDAR data;
identify a patch in the image data including a crack by processing the pixels with the corresponding points mapped using a classifier;
based on one or more features of the image, identify pixels in the patch corresponding to the crack; and
using the identified pixels in the patch corresponding to the crack, determine real-world dimensions of the crack.

13. The system of claim 12 wherein the one or more features of the image include at least one of pixel intensity values and pixel intensity gradients.

14. The system of claim 12 wherein, in identifying the pixels in the patch corresponding to the crack, the processor and the memory, with the computer code instructions, are further configured to cause the system to perform at least one of:
identifying pixels in the patch with an intensity below a threshold as the pixels corresponding to the crack; and
identifying pixels in the patch with an intensity gradient above a threshold as boundary outline pixels of the crack.

15. The system of claim 12 wherein, in identifying the pixels in the patch corresponding to the crack, the processor and the memory, with the computer code instructions, are configured to cause the system to:
identify pixels in the patch forming a boundary outline of the crack; and
identify pixels within the boundary outline;
wherein the identified pixels in the patch forming the boundary outline of the crack and the identified pixels within the boundary outline are the pixels in the patch corresponding to the crack.

16. The system of claim 12 wherein, in determining real-world dimensions of the crack using the identified pixels in the patch corresponding to the crack, the processor and the memory, with the computer code instructions, are configured to cause the system to:
for each identified pixel in the patch corresponding to the crack: (i) determine depth of the pixel based on a corresponding point in the point cloud data mapped to the pixel and (ii) determine real-world area of the real-world object represented by the pixel using the determined depth of the pixel.

17. A computer program product for automatically assessing cracks in real-world objects, the computer program product comprising:
one or more non-transitory computer-readable storage devices and program instructions stored on at least one of the one or more storage devices, the program instructions, when loaded and executed by a processor, cause an apparatus associated with the processor to:
map pixels in an image of a real-world object to corresponding points in point cloud data of the real-world object, wherein the point cloud data is light detection and ranging (LIDAR) data captured by a lidar sensor, the image is captured by a camera, and the mapping is based on (i) a transformation between a reference frame of the camera and a reference frame of the LIDAR sensor, (ii) a pose of the camera when capturing the image, and (iii) a pose of the LIDAR sensor when capturing the LIDAR data;
identify a patch in the image data including a crack by processing the pixels with the corresponding points mapped using a classifier;
based on one or more features of the image, identify pixels in the patch corresponding to the crack; and
using the identified pixels in the patch corresponding to the crack, determine real-world dimensions of the crack.

\* \* \* \* \*